(12) United States Patent
Palanisamy et al.

(10) Patent No.: US 10,940,863 B2
(45) Date of Patent: Mar. 9, 2021

(54) SPATIAL AND TEMPORAL ATTENTION-BASED DEEP REINFORCEMENT LEARNING OF HIERARCHICAL LANE-CHANGE POLICIES FOR CONTROLLING AN AUTONOMOUS VEHICLE

(71) Applicants: GM GLOBAL TECHNOLOGY OPERATIONS LLC, Detroit, MI (US); Carnegie Mellon University, Pittsburgh, PA (US)

(72) Inventors: Praveen Palanisamy, Sterling Heights, MI (US); Upali P. Mudalige, Oakland Township, MI (US); Yilun Chen, Pittsburgh, PA (US); John M. Dolan, Pittsburgh, PA (US); Katharina Muelling, Pittsburgh, PA (US)

(73) Assignees: GM GLOBAL TECHNOLOGY OPERATIONS LLC, Detroit, MI (US); CARNEGIE MELLON UNIVERSITY, Pittsburgh, PA (US)

( * ) Notice: Subject to any disclaimer, the term of this patent is extended or adjusted under 35 U.S.C. 154(b) by 188 days.

(21) Appl. No.: 16/177,834

(22) Filed: Nov. 1, 2018

(65) Prior Publication Data
US 2020/0139973 A1 May 7, 2020

(51) Int. Cl.
*B60W 30/18* (2012.01)
*G05D 1/00* (2006.01)
(Continued)

(52) U.S. Cl.
CPC ..... *B60W 30/18163* (2013.01); *G05D 1/0088* (2013.01); *G05D 1/0221* (2013.01);
(Continued)

(58) Field of Classification Search
CPC .. G05D 1/0088; G05D 1/0214; G05D 1/0221; G05D 1/0246; G05D 1/0253;
(Continued)

(56) References Cited

U.S. PATENT DOCUMENTS 9,760,806 B1 * 9/2017 Ning .................... G06N 3/0454
10,671,076 B1 * 6/2020 Kobilarov ............ G05D 1/0214
(Continued)

OTHER PUBLICATIONS

Chen, Yilun, "Learning-based Lane Following and Changing Behaviors for Autonomous Vehicle", CMU Master's Thesis, Technical Report CMU-RI-TR-18-26, May 17, 2018, 67 pages (Year: 2018).*
(Continued)

*Primary Examiner* — Faris S Almatrahi
*Assistant Examiner* — David A Testardi
(74) *Attorney, Agent, or Firm* — Lorenz & Kopf, LLP

(57) ABSTRACT

Systems and methods are provided that employ spatial and temporal attention-based deep reinforcement learning of hierarchical lane-change policies for controlling an autonomous vehicle. An actor-critic network architecture includes an actor network that process image data received from an environment to learn the lane-change policies as a set of hierarchical actions, and a critic network that evaluates the lane-change policies to calculate loss and gradients to predict an action-value function (Q) that is used to drive learning and update parameters of the lane-change policies. The actor-critic network architecture implements a spatial attention module to select relevant regions in the image data that are of importance, and a temporal attention module to learn temporal attention weights to be applied to past frames of image data to indicate relative importance in deciding which lane-change policy to select.

20 Claims, 11 Drawing Sheets

(51) Int. Cl.
*G05D 1/02* (2020.01)
*G06N 3/04* (2006.01)
*G06N 3/08* (2006.01)
*G06N 5/04* (2006.01)
*G08G 1/16* (2006.01)

(52) U.S. Cl.
CPC ......... *G05D 1/0246* (2013.01); *G06N 3/0454* (2013.01); *G06N 3/08* (2013.01); *G06N 5/046* (2013.01); *G08G 1/167* (2013.01); *B60W 2420/42* (2013.01); *G05D 2201/0213* (2013.01)

(58) Field of Classification Search
CPC .... G05D 2201/0213; B60W 30/18163; B60W 60/001; B60W 60/0011; B60W 60/0025; G08G 1/167; G06N 3/0454; G06N 3/08; G06N 3/084; G06N 3/088
See application file for complete search history.

(56) References Cited

U.S. PATENT DOCUMENTS

| | | | |
|---|---|---|---|
| 2017/0031361 A1* | 2/2017 | Olson | G06K 9/00791 |
| 2018/0009445 A1* | 1/2018 | Nishi | G05B 13/0265 |
| 2018/0011488 A1* | 1/2018 | Nishi | G05D 1/0221 |
| 2018/0300964 A1* | 10/2018 | Lakshamanan | B60W 30/00 |
| 2019/0035275 A1* | 1/2019 | Nishi | G01S 5/0072 |
| 2019/0113929 A1* | 4/2019 | Mukadam | B60W 30/085 |
| 2019/0179317 A1* | 6/2019 | England | G05D 1/0221 |
| 2019/0180502 A1* | 6/2019 | England | G01S 13/89 |
| 2019/0187707 A1* | 6/2019 | Zheng | G01C 21/3658 |
| 2019/0212749 A1* | 7/2019 | Chen | B62D 15/0255 |
| 2019/0265712 A1* | 8/2019 | Satzoda | B60W 40/09 |
| 2019/0266489 A1* | 8/2019 | Hu | B60W 50/00 |
| 2019/0299978 A1* | 10/2019 | Balakrishnan | G05D 1/0221 |
| 2019/0333381 A1* | 10/2019 | Shalev-Shwartz | G05D 1/0253 |
| 2019/0344797 A1* | 11/2019 | Palanisamy | B60W 30/18145 |
| 2019/0369637 A1* | 12/2019 | Shalev-Shwartz | G06K 9/00791 |
| 2019/0370580 A1* | 12/2019 | Aoi | A61B 5/4809 |
| 2020/0033868 A1* | 1/2020 | Palanisamy | G05D 1/0221 |
| 2020/0033869 A1* | 1/2020 | Palanisamy | B60W 40/04 |
| 2020/0089245 A1* | 3/2020 | Yadmellat | G08G 1/00 |
| 2020/0090074 A1* | 3/2020 | Isele | G06F 30/27 |
| 2020/0097754 A1* | 3/2020 | Tawari | G06K 9/3233 |
| 2020/0139989 A1* | 5/2020 | Xu | B60W 10/20 |

OTHER PUBLICATIONS

Min, Kyushik et al., "Deep Q Learning Based on High Level Driving Policy Determination", 2018 IEEE Intelligent Vehicles Symposium (IV), Changshu, Suzhou, China, Jun. 26-30, 2018, 6 pages (Year: 2018).*

Ye, Yingjun, "Automated vehicle's behavior decision making using deep reinforcement learning and high-fidelity simulation environment", arXiv publication arXiv:1804.06264v1 [cs.AI], dated Apr. 17, 2018, 22 pages, downloaded from: https://arxiv.org/abs/1804.06264 (Year: 2018).*

Yu, Lingli et al., "Intelligent Land-Vehicle Model Transfer Trajectory Planning Method Based on Deep Reinforcement Learning", Sensors 2018, 18, 2905, Sep. 1, 2018, MDPI, 22 pages (Year: 2018).*

Yi, Hongsuk, "Deep deterministic policy gradient for autonomous vehicle driving", Proceedings of the 2018 International Conference on Artificial Intelligence, ICAI'18, Jul. 30-Aug. 2, 2018, Las Vegas, USA, pp. 191 to 194 (Year: 2018).*

Chen, Yilun et al., "Attention-based hierarchical deep reinforcement learning for lane change behaviors in autonomous driving", 2019 IEEE/CVF Conference on Computer Vision and Pattern Recognition Workshops, (c) 2019 IEEE, 9 pages (Year: 2019).*

Arulkumaran, Kai et al. A Brief Survey of Deep Reinforcement Learning. IEEE Signal Magazine. Sep. 28, 2017.

Szepesvari, Csaba. Algorithms for Reinforcement Learning. Draft of the lecture published in the Synthesis Lectures on Artificial Intelligence & Machine Learning series by Morgon & Claypool Publishers. Jun. 9, 2009.

Lillicrap, Timothy P.; Hunt, Johnathan J.; Pritzel, Alexander; Heess, Nicolas; Erez, Tom; Tassa, Yuval; Silver, David and Wierstra, Daan. Continuous control with deep reinforcement learning. arXiv preprint arXiv:1509.02971, 2015. (Submitted on Sep. 9, 2015 (v1), last revised Feb. 29, 2016 (v5)).

Kulkarni, Tejas D.; Narasimhan, Karthik; Saeedi, Ardavan and Tenen-baum, Josh . Hierarchical deep reinforcement learning: Integrating temporal abstraction and intrinsic motivation. In Advances in neural information processing systems, pp. 3675-3683, 2016.

Luong, Minh-Thang; Pham, Hieu and Manning, Christopher D. Effective approaches to attention-based neural machine translation. arXiv preprint arXiv:1508.04025, 2015.

Seleznev, Ivan Alexey; Pavlov, Mikhail; Fedorov, Aleksandr and Ignateva, Anastasiia . Deep attention recurrent q-network. arXiv preprint arXiv:1512.01693, 2015.

Yang, Zhaoyang; Merrick, Kathryn; Jin, Lianwen and Abbass, Hussein A . Hierarchical deep reinforcement learning for continuous action control. IEEE Transactions on Neural Networks and Learning Systems, 2018.

\* cited by examiner

SPATIAL AND TEMPORAL ATTENTION-BASED DEEP REINFORCEMENT LEARNING OF HIERARCHICAL LANE-CHANGE POLICIES FOR CONTROLLING AN AUTONOMOUS VEHICLE

INTRODUCTION

The present disclosure generally relates to autonomous vehicles, and more particularly relates to autonomous vehicle controllers, autonomous vehicle control system systems and associated methods for controlling autonomous vehicles. More particularly, the present disclosure relates to spatial and temporal attention-based deep reinforcement learning of hierarchical lane-change policies for controlling an autonomous vehicle.

An autonomous vehicle is a vehicle that is capable of sensing its environment and navigating with little or no user input. An autonomous vehicle includes an autonomous driving system (ADS) that intelligently controls the autonomous vehicle. A sensor system senses its environment using sensing devices such as radar, lidar, image sensors, and the like. The ADS can also process information from global positioning systems (GPS) technologies, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels. Currently, there are many different approaches for autonomous vehicle control, but all suffer from drawbacks.

Deep reinforcement learning (DRL) has recently emerged as a new way to learn driving policies. DRL refers to any number of a machine learning technique that extend a reinforcement learning approach to learning of the entire process using deep learning techniques. DRL can be used to actively target problems that interact with the environment and learn by maximizing a scalar reward signal. An agent of a DRL algorithm uses a neural network (e.g., a convolutional neutral network that is used to recognize an agent's state) to select the action to be performed in response to receiving any given observation. Neural networks are machine learning models that employ one or more layers of nonlinear units to predict an output for a received input. A "deep neural network" is used to refer to a neural network with one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Performing safe and efficient lane-changes is a crucial feature for creating fully autonomous vehicles. With a deep reinforcement learning algorithm, the autonomous agent can obtain driving skills by learning from trial and error without any human supervision. Recent works have focused on applying Deep Q Network (DQN) or Deep Deterministic Policy Gradient (DDPG) to learn to drive. These works successfully demonstrated that a vehicle can learn to drive without leaving the road boundary. Recent advances have demonstrated successful lane following behavior using deep reinforcement learning, yet the interactions with other vehicles on road for lane-changes is rarely considered. In other words, most of these works focus on the task of lane following while the interactions with the surrounding vehicles are often ignored. In real traffic scenarios, more complex interactive behaviors should be considered such as lane changing for various driving purposes. Previously, rule-based lane-change maneuvers have been developed and researched, but less effort has been made to consider lane-change with deep reinforcement learning algorithms.

Understanding and interacting with human-driven cars is important in cooperative scenarios, such as lane changing, intersection traversing and ramp merging. Lane-change is a fundamental behavior in on-road driving for overtaking or navigation purposes. It requires high-level reasoning about surrounding vehicles' intentions and behavior to form an effective driving strategy. At the same time, it requires low-level reasoning to plan what exact path to follow under the safety requirements, generally known as the path planning problem. Each of these parts has been researched separately, but they are rarely optimized together.

Traditional lane-change maneuvers are rule-based and make lane-change decisions by checking empty slots. More recent methods include sampling-based methods, where a pool of possible lane-change maneuvers are pre-defined and the one with maximum cost or best mimicking the human's behavior is selected. The existing solutions require intensive hand-engineering and need an exhaustive pre-defined pool of possible lane-change maneuvers. This requires designers set up lots of parameters and spend large amounts of time tuning them.

Accordingly, it is desirable to provide systems and methods that are capable of learning policies for controlling an autonomous vehicle control that are reliable, easy to train and validate. Furthermore, other desirable features and characteristics of the present disclosure will become apparent from the subsequent detailed description and the appended claims, taken in conjunction with the accompanying drawings and the foregoing technical field and background.

SUMMARY

System, methods and a controller are provided for controlling an autonomous vehicle. In one embodiment, a method and a system are provided for learning lane-change policies via an actor-critic network architecture/system. Each lane-change policy describes one or more actions selected to be taken by an autonomous vehicle. The lane-change policies each comprise a high-level action and associated low-level actions. The high-level actions comprise: a left lane-change, lane following, and a right lane-change. Each of the associated low-level actions comprises a steering angle command parameter and an acceleration-brake rate parameter. An actor network processes image data received from an environment over time to learn the lane-change policies as a set of hierarchical actions. A critic network predicts action values via an action value function, evaluates a lane-change policy, and calculates loss and gradients to drive learning and update the critic network. The actor network includes a convolutional neural network (CNN), a spatial attention module, a temporal attention module, and at least one fully connected layer. At each particular time step the CNN processes the image data to generate a feature map that comprises a machine-readable representation of the driving environment that includes features of the environment acquired at the particular time step. At each particular time step the spatial attention module processes the feature map to select relevant regions in the image data that are of importance to focus on for computing actions when making lane-changes while driving, learns importance weights for each of the relevant regions of the image data and applies the learned importance weights to each of the relevant regions of the image data to add importance to the relevant regions of the image data, and generates a spatial context vector. At each particular time step, the temporal attention module processes the spatial context vector to learn temporal attention weights to be applied to past frames of image data to indicate relative importance in deciding which lane-change policy to select, and generates a combined context vector. At each particular time step the fully connected layer processes the combined context vector to generate the set of hierarchical actions (that are described above).

In one embodiment, the actor network processes the image data received from the environment to learn the lane-change policies as the set of hierarchical actions that are represented as a vector of a probability of action choices and a first set of parameters coupled to each discrete hierarchical action. The critic network predicts action values via the action value function using a second set of parameters. The action-value function is represented as a neural network using the second set of parameters. The critic network evaluates the lane-change policy, based on transitions generated by the actor network, where the transitions comprise the image data, the hierarchical actions, rewards, and next image data generated by the actor network.

In one embodiment, the critic network calculates the loss and the gradients to drive learning and update the second set of parameters of the critic network. For example, during a back-propagation mode, the critic network processes an obtained mini-batch of transitions comprising the image data, the hierarchical actions, rewards, the next image data generated by the actor network; computes first gradients of the action-value function by differentiating a loss of the critic network with respect to the second set of parameters; updates the second set of parameters at the critic network based on the first gradients; computes second gradients of the action-value function with respect to the hierarchical actions generated by the actor network by differentiating a loss of the critic network with respect to the hierarchical actions taken by the actor network. The first gradients are gradients of an error in predicting the action-value function with respect to the second set of parameters, and are used for updating for the second set of parameters of the critic network.

The critic network back-propagates the second gradients to the actor network. The actor network processes the second gradients along with third gradients generated by the actor network to update the first set of parameters. The third gradients are generated by differentiating a loss of the actor network with respect to the hierarchical actions taken by the actor network.

In one embodiment, the spatial attention module comprises: an attention network comprising at least one fully connected layer in which each neuron receives input from all activations of a previous layer; and an activation function coupled to the fully connected layer that coverts values into action probabilities. The CNN extracts a set of region vectors from the feature map by the CNN, where each region vector corresponds to a different feature layer of features extracted from a different image region of the image data by the CNN. The set of region vectors are applied to the attention network along with a previous hidden state vector that was generated by an LSTM network during a past time step to learn an importance weight for each region vector of the set of region vectors. The learned importance weights are applied to each region vector of the set of region vectors at the attention network to add importance to each region vector of the set of region vectors in proportion to importance of that region vector as learned by the attention network. The attention network generates the spatial context vector that is a lower dimensional weighted version of the set of the region vectors. The spatial context vector is represented by a weighted sum of all of the set of the region vectors.

In one embodiment, the spatial attention module and the temporal attention module comprise a Long Short-Term Memory (LSTM) network of LSTM cells. Each LSTM cell processes input data sequentially and keeps a hidden state of that input data through time. At each time step, the LSTM network processes the spatial context vector for that time step and the previous hidden state vector that was generated by the LSTM network during the past time step to generate an LSTM output. The LSTM network then learns a temporal attention weight for each LSTM output at each time step. The learned temporal attention weight is an inner product of the region vector at that time step and the hidden vector at that time step, and reflects a relative importance of that LSTM output at a given frame so that frames that matter the most for learning the correct actions are considered to have higher importance for computing an action output. A softmax function at the LSTM network normalizes the sum of all of the learned temporal attention weights to one, and the LSTM network then generates, at each time step, a weighted output for that time step that is equal to the product of a learned temporal attention weight at that time step and a hidden state vector at that time step.

In one embodiment, the temporal attention module generates the combined context vector, by combining, at the LSTM network at each time step, the LSTM outputs from each time step to generate the combined context vector that is a weighted sum of all the LSTM outputs over a number (T) of time steps.

In one embodiment, the actor-critic network architecture is based on a Deep Recurrent Deterministic Policy Gradient (DRDPG) algorithm that considers both temporal attention at the temporal attention module that learns to weigh the importance of previous frames of image data at any given frame of the image data, and spatial attention at the spatial attention module that learns the importance of different locations in the any given frame of the image data. The spatial attention module and the temporal attention module collectively improve lane-change policy selection of the actor network.

In one embodiment, the actor-critic network architecture is deployed within a vehicle controlled by a driver agent, and the driver agent chooses one of the high-level actions to execute at each time step based on a current observed environment.

In another embodiment, an autonomous vehicle is provided that includes a driving environment processor configured to acquire image data from an environment, a driver agent configured to control the autonomous vehicle based on a current observed environment and lane-change policies, and a processor configured to execute instructions of a computer program for learning lane-change policies via an actor-critic network architecture. Each lane-change policy describes one or more actions to be taken by the autonomous vehicle and comprises a high-level action and associated low-level actions. The high-level actions comprise: a left lane-change, lane following, and a right lane-change. Each of the associated low-level actions comprises a steering angle command parameter and an acceleration-brake rate parameter. In one embodiment, the driver agent is configured to select one of the high-level actions to execute at each time step based on the current observed environment.

When the instructions of the computer program for learning lane-change policies are executed by the processor, they are configurable to perform a method comprising: processing, via an actor network over time, image data received from the environment to learn the lane-change policies as a set of hierarchical actions; predicting, at a critic network, action values via an action value function; evaluating, at the critic network, a lane-change policy; and calculating, at the critic network, loss and gradients to drive learning and update the critic network. The processing via the actor network at each particular time step comprises: processing, at a convolutional neural network (CNN) of the actor network, the image data to generate a feature map that comprises a machine-readable representation of the driving environment that includes features of the environment acquired at the particular time step; processing, at a spatial attention module of the actor network, the feature map to select relevant regions in the image data that are of importance to focus on for computing actions when making lane-changes while driving; learning, at the spatial attention module, importance weights for each of the relevant regions of the image data; applying, at the spatial attention module, the learned importance weights to each of the relevant regions of the image data to add importance to the relevant regions of the image data; generating, at the spatial attention module, a spatial context vector; and processing, at a temporal attention module of the actor network, the spatial context vector to learn temporal attention weights to be applied to past frames of image data to indicate relative importance in deciding which lane-change policy to select; generating, at the temporal attention module, a combined context vector. The method further comprises: processing, via at least one fully connected layer, the combined context vector to generate the set of hierarchical actions.

In one embodiment, the spatial attention module comprises: an attention network comprising at least one fully connected layer in which each neuron receives input from all activations of a previous layer; and an activation function coupled to the fully connected layer that coverts values into action probabilities. The CNN extracts a set of region vectors from the feature map by the CNN, where each region vector corresponds to a different feature layer of features extracted from a different image region of the image data by the CNN. The set of region vectors are applied to the attention network along with a previous hidden state vector that was generated by an LSTM network during a past time step to learn an importance weight for each region vector of the set of region vectors. The learned importance weights are applied to each region vector of the set of region vectors at the attention network to add importance to each region vector of the set of region vectors in proportion to importance of that region vector as learned by the attention network. The attention network generates the spatial context vector that is a lower dimensional weighted version of the set of the region vectors. The spatial context vector is represented by a weighted sum of all of the set of the region vectors.

In one embodiment, the spatial attention module and the temporal attention module comprise a Long Short-Term Memory (LSTM) network of LSTM cells. Each LSTM cell processes input data sequentially and keeps a hidden state of that input data through time. At each time step, the LSTM network processes the spatial context vector for that time step and the previous hidden state vector that was generated by the LSTM network during the past time step to generate an LSTM output. The LSTM network then learns a temporal attention weight for each LSTM output at each time step. The learned temporal attention weight is an inner product of the region vector at that time step and the hidden vector at that time step, and reflects a relative importance of that LSTM output at a given frame so that frames that matter the most for learning the correct actions are considered to have higher importance for computing an action output. A softmax function at the LSTM network normalizes the sum of all of the learned temporal attention weights to one, and the LSTM network then generates, at each time step, a weighted output for that time step that is equal to the product of a learned temporal attention weight at that time step and a hidden state vector at that time step.

In one embodiment, the temporal attention module generates the combined context vector, by combining, at the LSTM network at each time step, the LSTM outputs from each time step to generate the combined context vector that is a weighted sum of all the LSTM outputs over a number (T) of time steps.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
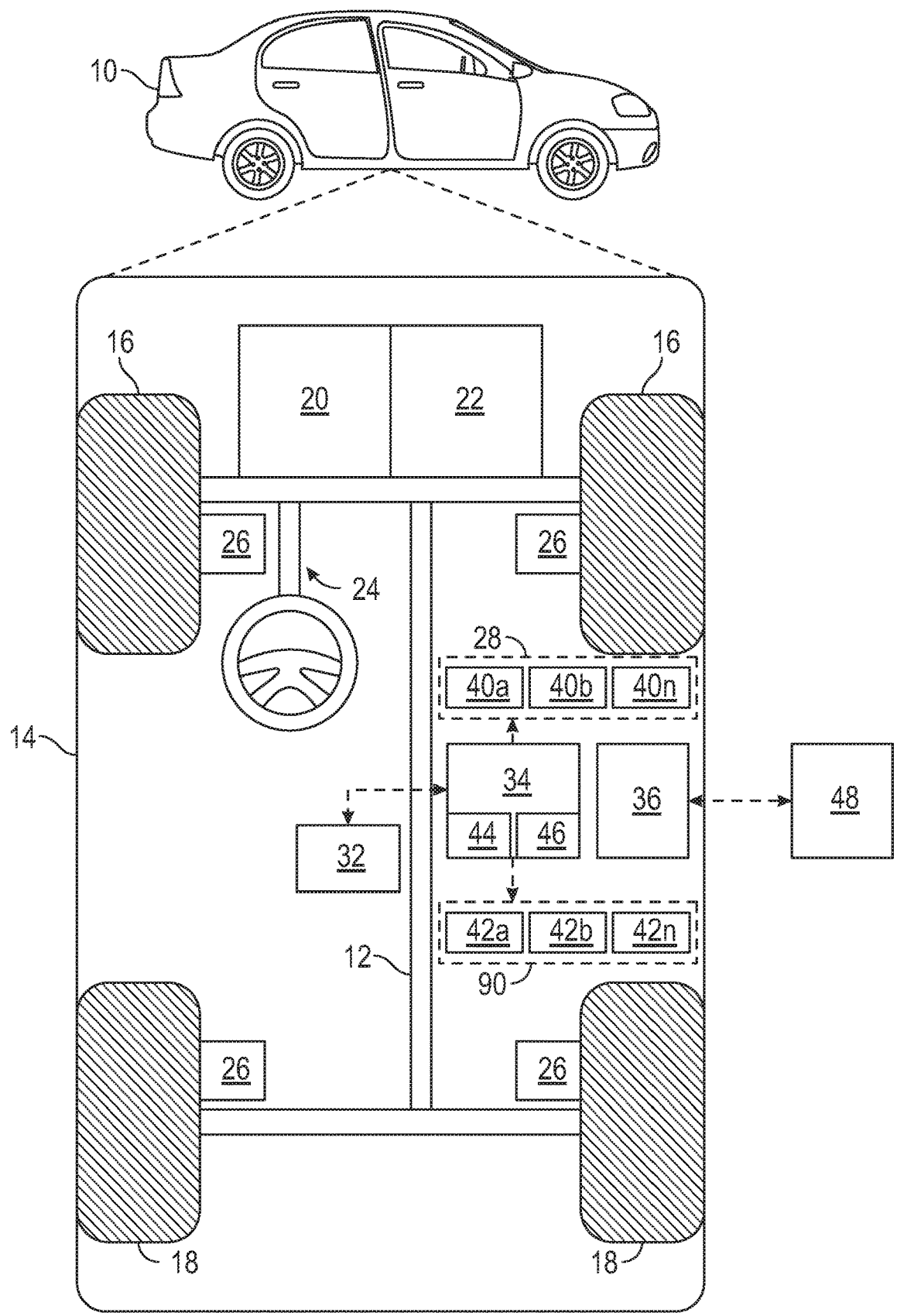
FIG. 1 is a functional block diagram illustrating an autonomous vehicle in accordance with the disclosed embodiments.

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

A neural network refers to a computing system or processing device that is made up of a number of simple, highly interconnected processing elements/devices/units, which can be implemented using software algorithms and/or actual hardware. The processing elements/devices/units process information by their dynamic state response to external inputs. A neural network can be organized in layers that are made up of a number of interconnected nodes. Each node includes an activation function. Patterns are presented to the network via an input layer, which communicates to one or more 'hidden layers' where the actual processing is done via a system of weighted connections. The hidden layers then link to an output layer where an output is generated. Most NNs contain some form of learning rule, which modifies the weights of the connections according to the input patterns that it is presented with. While each neural network is different, a neural network generally includes at least some of the following components: a set of processing units, the state of activation of a processing unit, the function used to compute output of a processing unit, the pattern of connectivity among processing units, the rule of activation propagation, the activation function, and the rule of learning employed. Design parameters for a neural network can include: the number of input nodes, the number of output nodes, the number of middle or hidden layers, the number of nodes per hidden layer, initial connection weights, the initial node biases, the learning rate, the momentum rate, etc.

FIG. 1 is a functional block diagram illustrating an autonomous vehicle in accordance with the disclosed embodiments. As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and an autonomous driving system (ADS) is incorporated into the autonomous vehicle 10 (hereinafter referred to as the autonomous vehicle 10) that intelligently controls the vehicle 10. The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 can be, for example, a Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, at least one data storage device 32, at least one controller 34, a communication system 36, and an actuator system 90. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, optical cameras, thermal cameras, imager sensors, ultrasonic sensors, inertial measurement units, global positioning systems, navigation systems, and/or other sensors.

For example, radar devices can process electromagnetic waves reflected from objects to generate radar data that indicates the presence, direction, distance, and speed of objects within the field of view. A radar filtering and preprocessing module can pre-process the radar data to remove things like stationary objects, objects in undriveable areas (like radar returns from buildings) and noisy measurements/interference (e.g., due to velocity) to generate preprocessed radar data. Radar tracking can then further process the preprocessed radar data to generate the radar tracking information, which can then be used to track objects.

Cameras (or image sensors) can be spaced to provide three-hundred and sixty (360) degree image coverage of the environment surrounding the vehicle 10. The cameras capture images (e.g., image frames) and output image data (e.g., a distorted, YUV format image), which can then be processed to generate rectified (or undistorted) camera images. An image preprocessing module can process the image data by undistorting/rectifying it, preprocessing the rectified image data (e.g., image resizing and mean subtraction), and converting the rectified, pre-processed image data into rectified camera images (e.g., having a normal RGB format) that a neural network of an image classification module can classify. The image data can be rectified to correct distortions in the image can cause lines that are straight (in reality) to appear curved, for example, if point clouds in 3D space were projected onto the unrectified image data, they might actually be in the wrong place in the image because of the distortions. By rectifying the image, the projections from 3D space correspond to the correct parts of the image. The rectified camera images can then be sent to an image classification module along with other inputs including three-dimensional locations of objects from an object tracking module, and processed to generate the image classification data that can be provided to an object classification module and used to generate object classification data, which can then be sent to an object tracking module that processes the objects, the radar tracking information, and object classification data to generate object tracking information.

Lidar devices perform a scan by illuminating a target with pulses of laser light, and measure distance to a target by receiving reflected pulses back. The intensity of the reflected pulses can be collectively used by the lidar devices to generate a lidar point cloud that represents the spatial structure/characteristics of objects within the field of view. For instance, the lidar devices can use rotating laser beams that rotate to scan three-hundred and sixty (360) degrees around the vehicle. Alternatively, the lidar devices can oscillate back and forth at a certain scan frequency (i.e., how fast they oscillate) and emit pulses at a repetition rate.

Each of the lidar devices receive lidar data and process the lidar data (e.g., packets of lidar return information) to generate a lidar point cloud (e.g., a three-dimensional set of points in a three-hundred and sixty (360) degree zone around the vehicle). Each point has intensity data in addition to a three-dimensional XYZ location. For example, in one implementation, the point cloud includes a first, intermediate and last returned from each laser pulse. The lidar devices can be synchronized together (or phase locked).

Cameras can be run at their maximum frame rate, and the refresh rate of the cameras is usually much higher than the lidar devices. As lidar spins clockwise from the back of the vehicle, each camera captures images in a clockwise order during the lidar device's rotation. An extrinsic calibration procedure can provide information regarding where the cameras are pointing. The lidar devices are phase locked (i.e., scheduled to be in certain rotational positions at certain times) so it is known when the lidar devices scan certain parts of their cycle. For analysis of a scene, the system can determine which imager/camera is aligned at a point in time when certain lidar data was acquired. The system can the select whatever image was sampled/obtained closest to the point in time during which the lidar data was acquired such that only images that were captured near a certain target time (i.e., when the lidar device is looking at the same region that a camera is pointing) will be processed. As a result, camera-lidar pairs with excellent alignment can be determined. This gives lidar data at a certain heading/orientation along with corresponding image data for the scene/environment at that heading/orientation.

Lidar data of the lidar point clouds acquired by the lidar devices can be fused into a single lidar point cloud. Three-dimensional point sampling can then be performed to pre-process the lidar data (of the single lidar point cloud) to generate a set of three-dimensional points, which can then be segmented by an object segmentation module into objects that can be classified and tracked. For instance, an object classification module can include multiple classifiers that classify the objects to generate object classification data. An object tracking module can track the objects. Tracking information can then be used along with the radar tracking information and the object classification data to generate object tracking information (e.g., temporal tracking information for objects such as location, geometry, speed, etc. of objects in the environment).

The actuator system 90 includes one or more actuator devices 42a-42n that control one or more vehicle features such as, but not limited to, the propulsion system 20, the transmission system 22, a throttle system (not illustrated), the steering system 24, and the brake system 26. As will be explained below, a low-level controller processes control signals from a vehicle control module to generate commands that control one or more of these actuator devices 42a-42n in accordance with the control signals 172 to schedule and execute one or more control actions to be performed to automatically control the autonomous vehicle and automate the autonomous driving task encountered in the particular driving scenario (e.g., to achieve one or more particular vehicle trajectory and speed profiles). In addition, in some embodiments, the vehicle features can further include interior and/or exterior vehicle features such as, but are not limited to, doors, a trunk, and cabin features such as air, music, lighting, etc. (not numbered).

Figure 2:
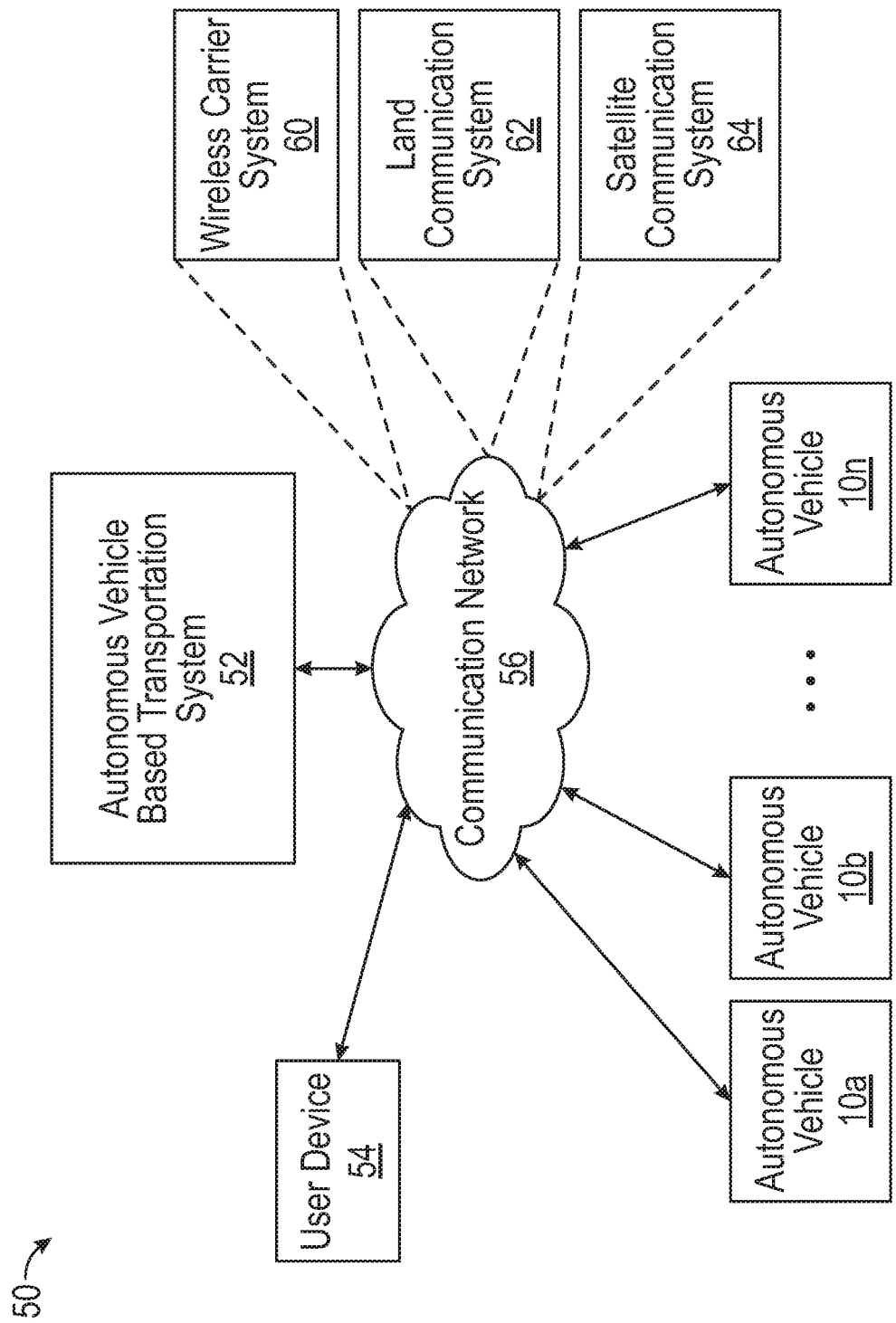
FIG. 2 is a functional block diagram illustrating a transportation system having one or more autonomous vehicles of FIG. 1 in accordance with the disclosed embodiments.

The communication system 36 is configured to wirelessly communicate information to and from other entities 48, such as but not limited to, other vehicles ("V2V" communication) infrastructure ("V2I" communication), remote systems, and/ or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 90 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control one or more actuator devices 42a-42n that control one or more vehicle features of the autonomous vehicle 10.

In various embodiments, one or more instructions of the controller 34 are embodied in a high-level controller of an autonomous driving system (ADS) and, when executed by the processor 44, can decompose the autonomous driving task into a sequence of sub-tasks that address the particular driving scenario and select a particular combination of sensorimotor primitive modules to be enabled and executed for the particular driving scenario that each address a sub-task. Each of the sensorimotor primitive modules generates a vehicle trajectory and speed profile, and at least one of the vehicle trajectory and speed profiles can be processed to generate the control signals that are processed by a low-level controller to generate commands that control one or more of actuators of the autonomous vehicle to execute one or more control actions to automatically control the autonomous vehicle (e.g., to automate the autonomous driving task encountered in the particular driving scenario).

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more autonomous vehicles 10a-10n as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide unidirectional or bi-directional communication with the autonomous vehicles 10*a*-10*n*. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10*a*-10*n* to schedule rides, dispatch autonomous vehicles 10*a*-10*n*, and the like. In various embodiments, the remote transportation system 52 stores account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10*a*-10*n* (when and if one is available) to pick up the passenger at the designated pickup location and at the appropriate time. The remote transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
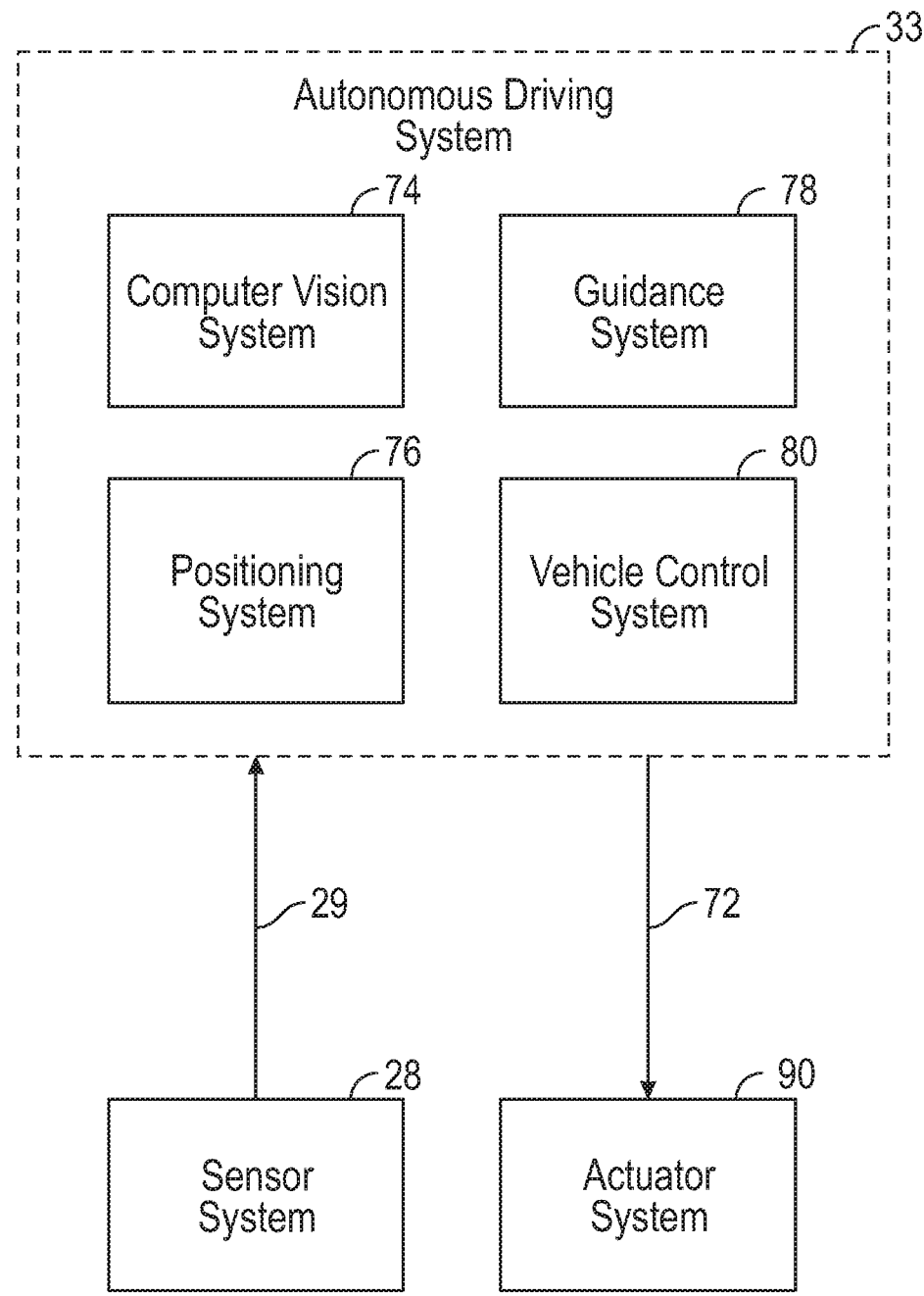
FIG. 3 is a dataflow diagram illustrating an autonomous driving system of the autonomous vehicle in accordance with the disclosed embodiments.

In accordance with various embodiments, the controller 34 implements a high-level controller of an autonomous driving system (ADS) 33 as shown in FIG. 3. That is, suitable software and/or hardware components of the controller 34 (e.g., the processor 44 and the computer-readable storage device 46) are utilized to provide a high-level controller of an autonomous driving system 33 that is used in conjunction with vehicle 10.

In various embodiments, the instructions for the high-level controller of the autonomous driving system 33 may be organized by function, module, or system. For example, as shown in FIG. 3, the high-level controller of the autonomous driving system 33 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors. The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals 72 for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

As mentioned briefly above, the high-level controller of the ADS 33 is included within the controller 34 of FIG. 1, and can be used to implement portions of a vehicle control system that includes a sensor system, which may correspond to sensor system 28 of FIG. 3 in some embodiments.

As will now be described below with reference to FIGS. 4-11, the disclosed embodiments can provide an autonomous driving system that uses a deep reinforcement learning-based methodology to learn sub-policies for lane changing behavior with a hierarchical action structure suited lane-change behavior. A hierarchical Deep Reinforcement Learning (DRL) algorithm can learn lane-change behaviors in dense traffic. The algorithm can deal with lane-change behaviors on road to learn multiple driving policies in one model. By breaking down overall behavior to sub-policies, faster and safer lane-change actions can be learned. In addition, temporal and spatial attention are applied to the DRL architecture, which helps the vehicle focus more on surrounding vehicles and leads to smoother lane-change behavior. Instead of separately optimizing the high-level and low-level reasoning, the disclosed embodiments combine them in one network with a hierarchical structure, which can still be trained in an end-to-end fashion. By designing a hierarchical action space, the network can maintain a high-level strategy and a low-level control command at the same time, while being differentiable end-to-end. This encourages shared computation and optimizes for the overall performance. The disclosed embodiments can ultimately result a hierarchical action structure of a sub-policies for lane changing behavior that can allow a vehicle to perform safe and efficient lane-changes, which is a crucial feature for delivering fully autonomous vehicles on road.

The disclosed embodiments provide a system and methodology to use temporal attention and spatial attention in deep reinforcement learning algorithm to learn smoother behavior policies. The disclosed embodiments integrate both temporal and spatial attention mechanisms that are suitable for learning driving policies used in autonomous driving, particularly lane-change maneuvers and behaviors. During the training of deep reinforcement learning, the attention mechanism will automatically focus on the end of the road or surrounding on-road vehicles that may influence driving behavior. This can eventually help promote the quality of the learned lane-change behavior. The attention-enhanced network can better use perception information and leads to shorter convergence time and better performance.

The attention-based, hierarchical deep reinforcement learning algorithm can learn lane-change behaviors in dense traffic with an end-to-end trainable architecture. The proposed hierarchical action space for learning driving behaviors can generate sub-policies for lane-change behaviors aside from the lane following behavior. This model simplifies the work of deliberately designing sophisticated lane-change maneuver, but introduces a data-oriented approach that can learn the lane-change policy through trial and error. The attention mechanism can help in the task of driving with deep reinforcement learning. The two streams of temporal attention and spatial attention help boost the performance in deep reinforcement learning. The attention model also helps to explain what is learned in the driving mode.

Figure 4:
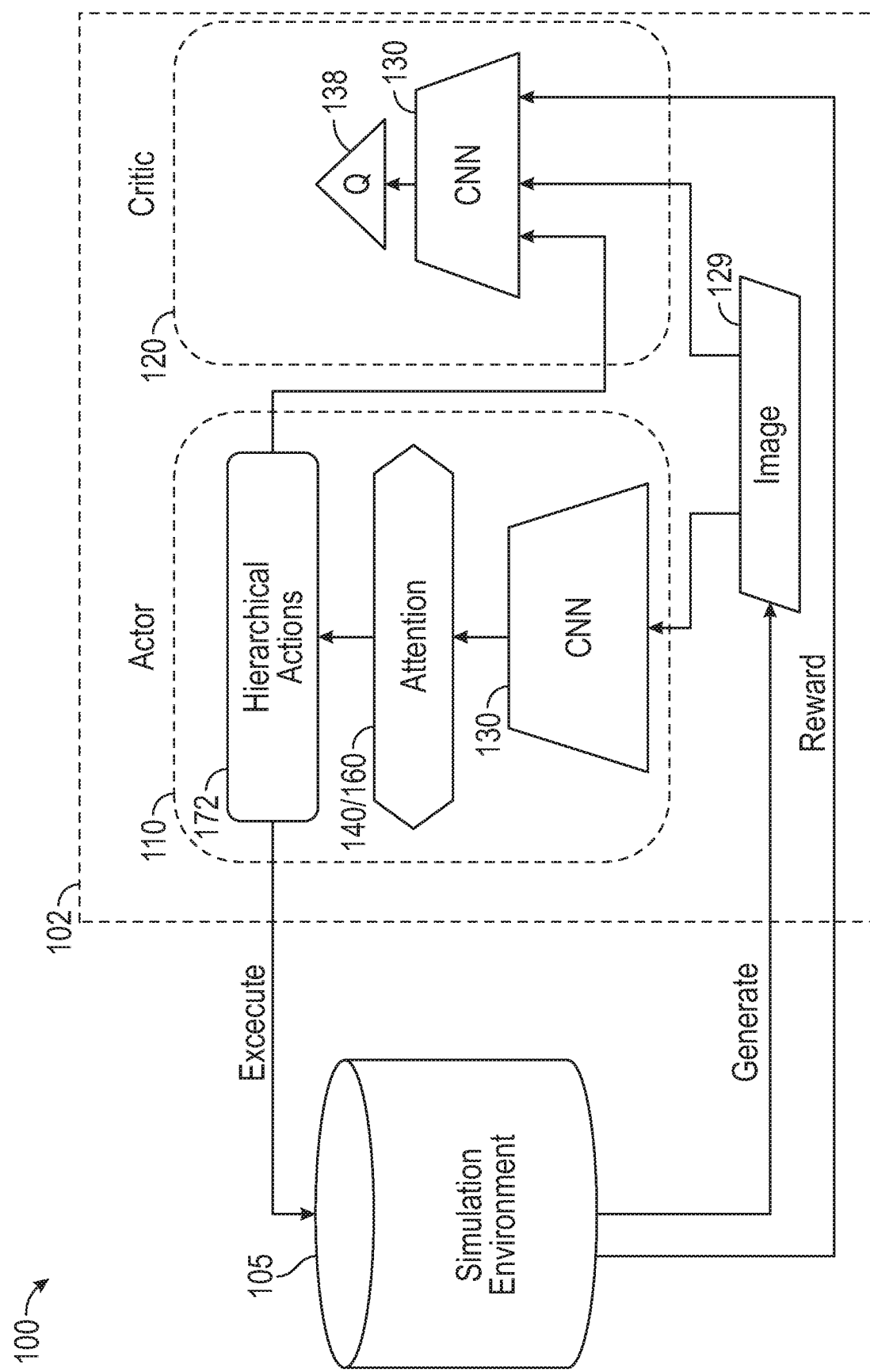
FIG. 4 is a block diagram of a DRL system in accordance with the disclosed embodiments.

FIG. 4 is a block diagram of a DRL system 100 in accordance with the disclosed embodiments. The DRL system 100 includes an actor-critic network architecture 102 based deep reinforcement learning (DRL) algorithm, and an environment 105, which in this case is a simulation environment, but it should be appreciated that when the actor-critic network architecture 102 is implemented online within a real autonomous vehicle the environment 105 can be an actual driving environment as will be described in greater detail below. In this regard, it should be noted that the image data 129 in FIG. 4 can vary depending on the implementation. That is, in a simulation environment, the image data of a rendered environment scene is used as the image data 129, whereas in a real/actual driving environment, the image data obtained through the sensors (e.g., sensors 28 in FIG. 3) sensing the driving environment (i.e., actual observations from the driving environment) is used as the image data 129. Throughout this disclosure, the terms "image data" and "state" are used interchangeably.

In accordance with the disclosed embodiments, the DRL algorithm used implement an actor-critic network architecture 102 can be any type of policy-gradient-based reinforcement learning algorithms. For example, Proximal Policy Optimization (PPO), deterministic policy gradients and their derived algorithms are suitable and can be used in the proposed system as they can be used to realize/implement the actor-critic network architecture 102

In one embodiment, the DRL algorithm is a Deep Recurrent Deterministic Policy Gradient (DRDPG) algorithm, which is a recurrent version of the Deep Deterministic Policy Gradient (DDPG) algorithm that was recently developed for continuous control. As will be described in greater detail below, the DRDPG algorithm builds in recurrence and considers both temporal attention and spatial attention.

In accordance with the disclosed embodiments, for better training stability, an actor-critic architecture 102 is implemented with two neural networks: an actor network 110 and a critic network 120. This architecture decouples the action evaluation and the action selection process into two separate deep neural networks.

The actor network 110 learns lane-change policies as a set of hierarchical actions 172. Each lane-change policy is a distribution (or action distribution) over hierarchical actions 172. For example, in one embodiment, the actor network 110 processes the image data received from the environment to learn the lane-change policies as the set of hierarchical actions that are represented as a vector of a probability of action choices and a first set of parameters coupled to each discrete hierarchical action. The actor network 110 collects transitions each comprising an observation (i.e., frame of image data), a hierarchical action, reward, a next observation (i.e., next frame of image data), and stores them in a replay memory.

The critic network 120 predicts action values via an action value function, evaluates a lane-change policy, and calculates loss and gradients to drive learning and update the critic network 120. For example, in one embodiment, the critic network 120 draws a mini-batch of the transitions each comprising: {an observation, hierarchical action, reward, a next observation}, collected by the actor network 110, from the replay memory and uses the mini-batch of transitions to improve the critic network 120 prediction of the state/action/advantage value. The actor-critic network architecture 102 uses the predictions of the state/action/advantage value, the obtained rewards and the policy gradient theorem to calculate loss. The predictions are used by the actor-critic network architecture 102 internally to calculate the critic's loss and drive the learning process to update the policy parameters. The loss is the overall combined loss for both the actor network 110 and the critic network 120 (for the batch of inputs). As will be explained in greater detail below with reference to FIG. 6, the gradients are calculated by differentiating the critic loss with respect to the critic parameters, and the actor loss with respect to the actor parameters.

In one embodiment, the critic network 120 calculates the loss and the gradients to drive learning and update the critic parameters of the critic network 120. For example, during a back-propagation mode, the critic network 120 processes an obtained mini-batch of transitions comprising the image data, the hierarchical actions, rewards, the next image data generated by the actor network 110; computes first gradients of the action-value function by differentiating a loss of the critic network 120 with respect to the critic parameters; updates the critic parameters at the critic network 120 based on the first gradients; computes second gradients of the action-value function with respect to the hierarchical actions generated by the actor network 110 by differentiating a loss of the critic network 120 with respect to the hierarchical actions taken by the actor network 110. The first gradients are gradients of an error in predicting the action-value function with respect to the critic parameters, and are used for updating for the critic parameters of the critic network 120.

The critic network 120 back-propagates the second gradients to the actor network 110. The actor network 110 processes the second gradients along with third gradients generated by the actor network 110 to update the actor parameters. The third gradients are generated by differentiating a loss of the actor network 110 with respect to the hierarchical actions taken by the actor network 110.

The actor network 110 and the critic network 120 share a convolutional neural network (CNN) 130. A CNN is a class of deep, feed-forward artificial neural networks. They are also known as shift invariant or space invariant artificial neural networks (SIANN), based on their shared-weights architecture and translation invariance characteristics. A CNN architecture is formed by a stack of distinct layers that transform the input volume into an output volume through a differentiable function. A few distinct types of layers are commonly used called convolution layers and max-pooling layers. A convolutional layer's parameters consist of a set of learnable filters (or kernels), which have a small receptive field, but extend through the full depth of the input volume. During the forward pass, each filter is convolved across the width and height of the input volume, computing the dot product between the entries of the filter and the input and producing a 2-dimensional activation map of that filter. As a result, the network learns filters that activate when it detects some specific type of feature at some spatial position in the input. Stacking the activation maps for all filters along the depth dimension forms the full output volume of the convolution layer. Every entry in the output volume can thus also be interpreted as an output of a neuron that looks at a small region in the input and shares parameters with neurons in the same activation map.

When dealing with high-dimensional inputs such as images, it is impractical to connect neurons to all neurons in the previous volume because such a network architecture does not take the spatial structure of the data into account. Convolutional networks exploit spatially local correlation by enforcing a local connectivity pattern between neurons of adjacent layers: each neuron is connected to only a small region of the input volume. The extent of this connectivity is a hyperparameter called the receptive field of the neuron. The connections are local in space (along width and height), but always extend along the entire depth of the input volume. Such an architecture ensures that the learnt filters produce the strongest response to a spatially local input pattern.

Three hyperparameters control the size of the output volume of the convolutional layer: the depth, stride and zero-padding. The depth of the output volume controls the number of neurons in a layer that connect to the same region of the input volume. These neurons learn to activate for different features in the input. For example, if the first convolutional layer takes the raw image as input, then different neurons along the depth dimension may activate in the presence of various oriented edges, or blobs of color. Stride controls how depth columns around the spatial dimensions (width and height) are allocated. When the stride is 1 then we move the filters one pixel at a time. This leads to heavily overlapping receptive fields between the columns, and also to large output volumes. When the stride is 2 (or rarely 3 or more) then the filters jump 2 pixels at a time as they slide around. The receptive fields overlap less and the resulting output volume has smaller spatial dimensions. Sometimes it is convenient to pad the input with zeros on the border of the input volume. The size of this padding is a third hyperparameter. Padding provides control of the output volume spatial size. In particular, sometimes it is desirable to exactly preserve the spatial size of the input volume.

The spatial size of the output volume can be computed as a function of the input volume size W, the kernel field size of the Cony Layer neurons K, the stride with which they are applied S, and the amount of zero padding P used on the border. The formula for calculating how many neurons "fit" in a given volume is given by (W−K+2P)/S+1. If this number is not an integer, then the strides are set incorrectly and the neurons cannot be tiled to fit across the input volume in a symmetric way. In general, setting zero padding to be P=(K−1)/2 when the stride is S=1 ensures that the input volume and output volume will have the same size spatially. Though it's generally not completely necessary to use up all of the neurons of the previous layer, for example, just a portion of padding may be used. A parameter sharing scheme is used in convolutional layers to control the number of free parameters. It relies on one reasonable assumption: That if a patch feature is useful to compute at some spatial position, then it should also be useful to compute at other positions. In other words, denoting a single 2-dimensional slice of depth as a depth slice, the neurons are constrained in each depth slice to use the same weights and bias. Since all neurons in a single depth slice share the same parameters, then the forward pass in each depth slice of the CONV layer can be computed as a convolution of the neuron's weights with the input volume (hence the name: convolutional layer). Therefore, it is common to refer to the sets of weights as a filter (or a kernel), which is convolved with the input. The result of this convolution is an activation map, and the set of activation maps for each different filter are stacked together along the depth dimension to produce the output volume. Parameter sharing contributes to the translation invariance of the CNN architecture. Sometimes the parameter sharing assumption may not make sense. This is especially the case when the input images to a CNN have some specific centered structure, in which completely different features are to be learned on different spatial locations.

Another important concept of CNNs is pooling, which is a form of non-linear down-sampling. There are several non-linear functions to implement pooling including max pooling. Max pooling layers can be inserted between successive convolutional layers of the CNN architecture. In max pooling the input image is partitioned into a set of non-overlapping rectangles and, for each such sub-region, outputs the maximum. The pooling layer serves to progressively reduce the spatial size of the representation, to reduce the number of parameters and amount of computation in the network, and hence to also control overfitting. The pooling operation provides another form of translation invariance. Each max pooling layer operates independently on every depth slice of the input and resizes it spatially. The most common form is a pooling layer with filters of size 2×2 applied with a stride of 2 downsamples at every depth slice in the input by 2 along both width and height, discarding 75% of the activations. In this case, every max operation is over 4 numbers. The depth dimension remains unchanged.

Max-pooling allows CNNs to take advantage of the 2D structure of input data. As such, CNNs are suitable for processing visual and other two-dimensional data. They can be trained with standard backpropagation. CNNs are easier to train than other regular, deep, feed-forward neural networks and have many fewer parameters to estimate.

Human drivers can consider a series of historical observations to make driving decisions. They split a different amount of heed according to time and location of the observations. To help provide this capability in an autonomous vehicle, the DRL algorithm of the disclosed embodiments includes an attention module 140/160. The attention module 140/160 is added to the actor network 110 for the sake of better action selection. In accordance with the disclosed embodiments, the attention module of the actor network 110 includes a spatial attention module 140 and a temporal attention module 160.

As illustrated in FIG. 4, image data 129 is received from the environment 105 and processed by the CNN 130. With respect to the actor network 110, the CNN 130 processes the image data 129 to generate an output a feature map, as will be described in greater detail below with reference to FIG. 7B. For example, in one embodiment, the CNN 130 derives the feature map 132 from the camera-based RGB images captured by cameras and/or range images captured by radars and/or lidars.

The feature map is first applied to the spatial attention module 140 of the attention module to generate an output that is then applied to the temporal attention module 160 of the attention module. Temporal attention module 160 can then generate a combined context vector as its output that can then be used by other layers to generate the hierarchical actions 172. As will be described in greater detail below, the hierarchical actions 172 includes a number of lane-change policies that have been learned by the actor network 110. At least some of the lane-change policies of the hierarchical actions 172 can then be executed within the environment 105 to generate new image data 129, which in this case are new image data. The CNN 130 of the critic network 120 can evaluate lane-change policies of the hierarchical actions 172 to generate an action-value function (Q) 138. Further details about the actor-critic network architecture 102 now be described below with reference to FIGS. 5 and 6.

Figure 5:
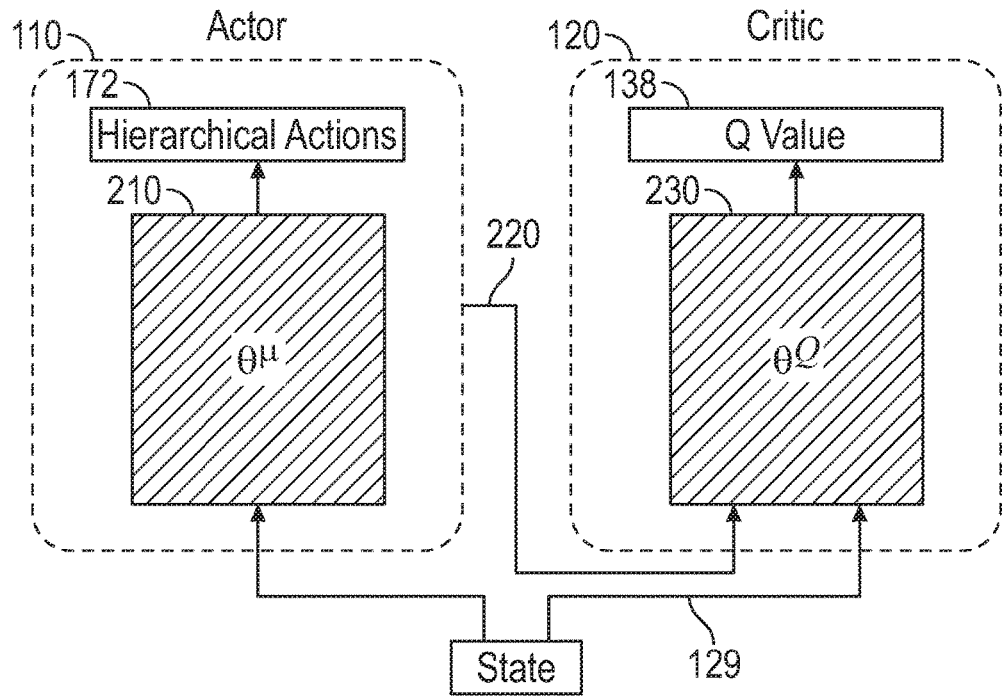
FIG. 5 is a block diagram of the actor-critic network architecture of FIG. 4 that illustrates a data flow while the actor-critic network architecture is learning during inference mode or a forward pass in accordance with the disclosed embodiments.

FIG. 5 is a block diagram of the actor-critic network architecture 102 of FIG. 4 that illustrates a data flow while the actor-critic network architecture 102 is learning (during inference mode or a forward pass) in accordance with the disclosed embodiments. As described above, in the actor network 110 and the critic network 120 process the image data 129. In particular, the actor network 110 processes the image data 129 to generate the hierarchical actions 172, which is represented using parameters $\theta^\mu$ 210, and the critic network 120 processes the hierarchical actions 172 from the actor network 110 to generate the action-value function (Q) 138, which is represented using other parameters $\theta^Q$ 230. Stated differently, the actor network μ 110, parameterized by $\theta^\mu$ 210, takes as input state s 129 and outputs hierarchical actions a 172 along with its parameter $p_a$. The critic network Q 120, parameterized by $\theta^Q$ 230, takes as input state s 129 and hierarchical actions a 220 along with its parameter $p_a$ and outputs a scalar Q-Value Q(s, a) 138. The hierarchical action a is represented as a vector of the probability of action choices p and the parameters $P_a$ coupled to each discrete action. The discrete high-level action is chosen to be the output with maximum value among the choices of action probabilities. Then it is coupled with the corresponding parameters from the parameter outputs. Though the parameters of all actions are output, only the parameters of the chosen action are used. In this way, the actor network 110 simultaneously outputs which discrete action to execute and how to choose parameters for that action. The critic network 120 receives as input all the values from the output layer of the actor network 110.

Figure 6:
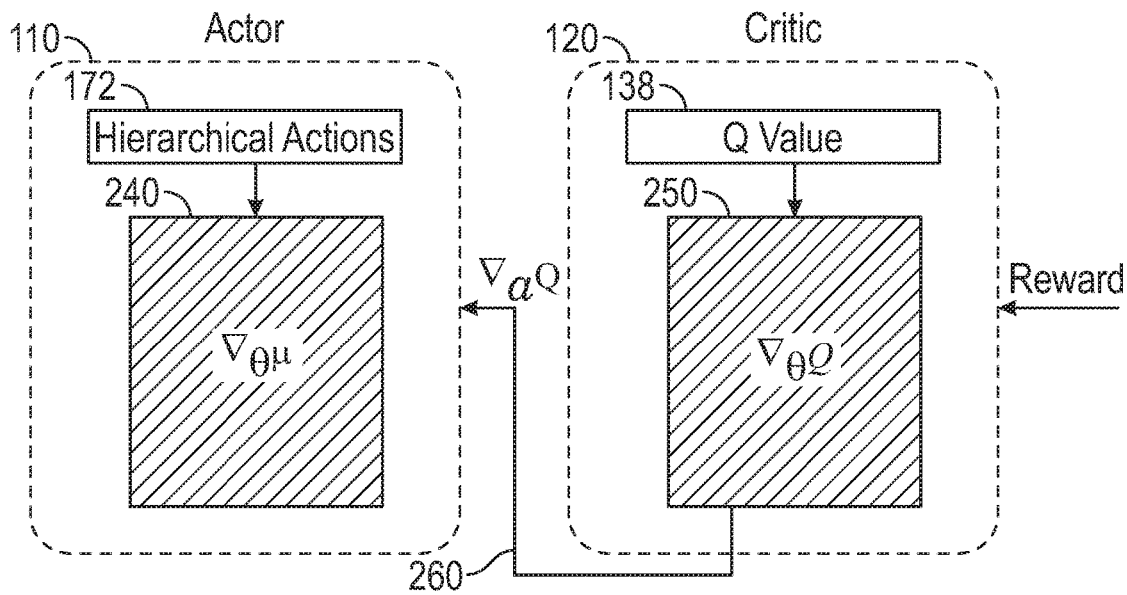
FIG. 6 is a block diagram of the actor-critic network architecture of FIG. 4 that illustrates a gradient flow while the actor-critic network architecture is training during a back-propagation mode or a backward pass in accordance with the disclosed embodiments.

By contrast, FIG. 6 is a block diagram of the actor-critic network architecture 102 of FIG. 4 that illustrates a gradient flow while the actor-critic network architecture 102 is training (during a back-propagation mode or a backward pass) in accordance with the disclosed embodiments. In FIG. 6, two distinct sets of gradients 250, 260 will be described. To differentiate between the two, the gradients of the action value function (Q) will be referred to below as "first" gradients 250, and the gradients of the action-value function (Q) 138 with respect to actions generated by the actor network 110 will be referred to as "second" gradients 260.

In the back-propagation stage, the critic network 120 processes an obtained mini-batch of transitions including states, actions, rewards and next states ($s_t$, $a_t$, $r_t$, $s_{t+1}$), and computes first gradients 250 of the action-value function (Q) 138 by differentiating a loss of the critic network 120 with respect to the critic parameters ($\theta^Q$) 230. The first gradients 250 are gradients of an error in predicting the action-value function (Q) 138 with respect to the critic parameters ($\theta^Q$) 230, and are used for updating for the critic parameters ($\theta^Q$) 230 of the critic network 120. The critic network 120 updates the critic parameters ($\theta^Q$) 230 at the critic network 120 based on the first gradients 250.

In one embodiment, the critic's parameters 230 are updated by minimizing the mean-squared action-value prediction error using stochastic gradient descent (SGD). The critic network's loss can be computed using the following equation:

$$L_{critic}=1/N\Sigma_t(\text{target}_t-Q(s_t,a_t|\theta^Q))^2$$

where: $\text{target}_t=r_t+\gamma Q'(s_{t+1}, \mu'(s_{t+1}|\theta^{\mu'})|\theta^{Q'})$, N is the number of transitions in the mini-batch (usually drawn at random from the replay memory) that is used during the update, $\theta^Q$ are the critic parameters 230, $\theta^\mu$ are the actor parameters 210, and $\theta^{Q'}$ and $\theta^{\mu'}$ are copies of $\theta^Q$ and $\theta^\mu$ respectively that are updated after every k learning steps using the following update equations:

$$\theta^{Q'}=\tau\theta^Q+(1-\tau)\theta^{Q'}$$

$\theta^{\mu'}=\tau\theta^\mu+(1-\tau)\theta^{\mu'}$ where τ (tau) is a tunable parameter.

The critic network's parameters are updated using stochastic gradient descent (SGD) to minimize the critic's loss function $L_{critic}$. The gradient of the loss function $L_{critic}$ with respect to the critic parameters ($\theta^Q$) 230 is given by $\nabla_\theta L_{critic}$ written in short as: $\nabla_\theta \varrho$ 250. The critic parameters 230 can then be updated using a SGD optimizer's optimization step (e.g., $\theta^Q = \theta^Q + \alpha \nabla_\theta \varrho$).

The critic network 120 computes second gradients 260 of the action-value function (Q) 138 with respect to actions generated by the actor network 110 by differentiating a loss of the actor network 110 with respect to the actions taken by the actor network 110, and back-propagates the second gradients 260 to the actor network 110.

The loss of the actor network can be computed using the following equation:

$$\underbrace{\nabla_{\theta^\mu}}_{240} = -\frac{1}{N}\sum i \underbrace{\nabla_{\theta^\mu} \mu(s|\theta^\mu)|_{s_t}}_{172} \underbrace{\nabla_a Q(s,a|\theta^Q)|_{s=s_t,a=\mu(s_t)}}_{260}$$

The actor network 110 processes the second gradients 260 along with the hierarchical actions 172 to update the actor parameters ($\theta^\mu$) 210 of FIG. 5. In one embodiment, the actor parameters ($\theta^\mu$) 210 can be updated using a SGD optimization step (e.g., $\theta^\mu = \theta^\mu + \alpha \nabla_{\theta^\mu}$).

Thus, the actor network 110 is a NN that takes in the current environment state (i.e., the image data 129) to learn, and then determines the best action to take from there to update lane-change policies of the hierarchical actions 172 (i.e., learns lane-change policies as hierarchical actions). When an action (e.g., steer/acceleration/deceleration) is taken/applied to the current environment 105, this results in a change in the image data 129 and a reward that is interpreted by the critic network 120. The critic network 120 is a NN that evaluates the reward and the new state (i.e., new image data 129) via a value function, and back-propagates an error to update its value function and one or more lane-change policies of the actor network 110. The policy of the actor network 110 is updated based on the policy loss (determined by the actor network 110) and the value loss (determined by how much the critic network's predicted value estimate is off compared to the true value calculated using the obtained reward). The actor network 110 reacts to the new image data 129 and back propagation from the critic network 120.

Figure 7A:
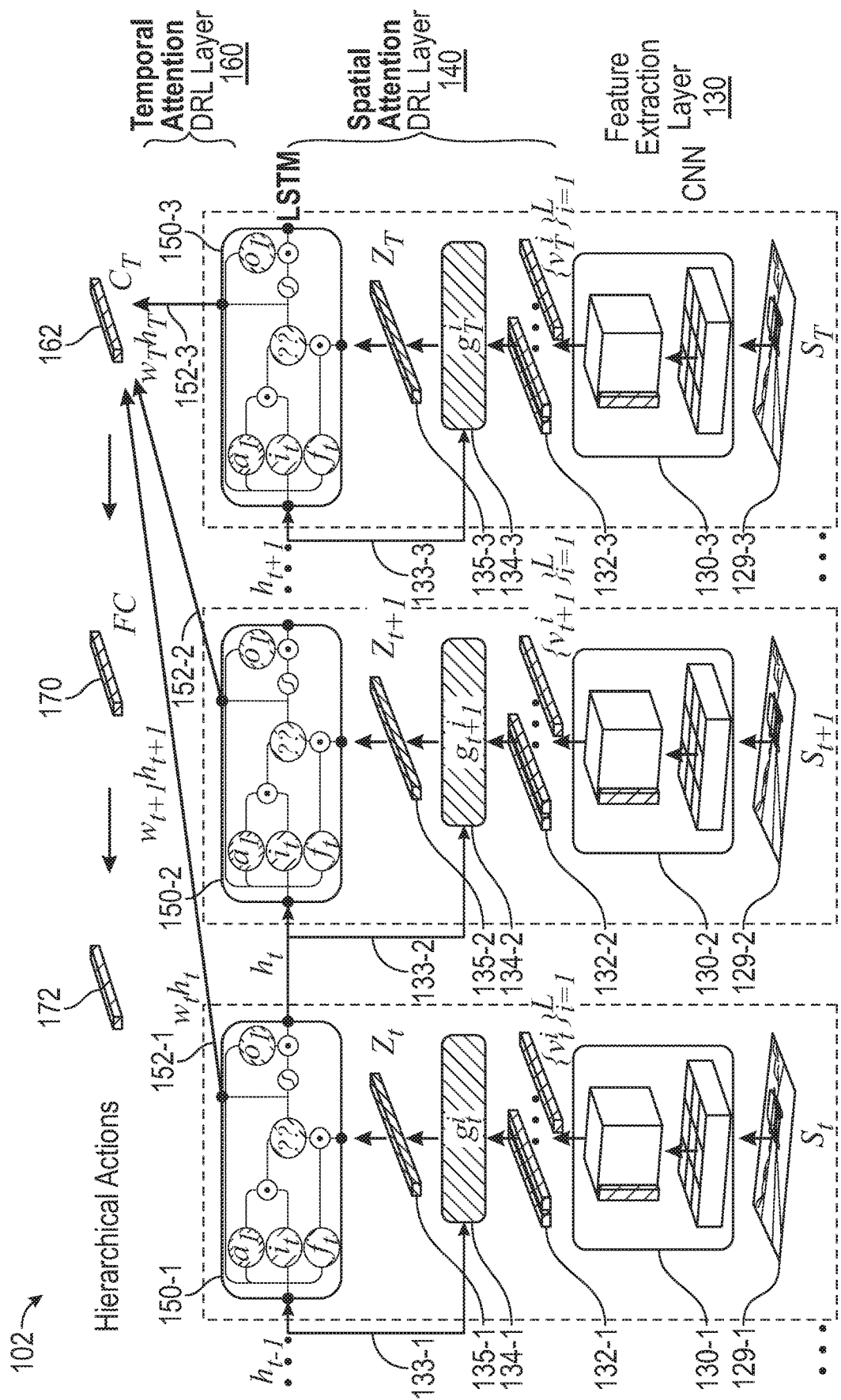
FIG. 7A is a block diagram of one example implementation of the actor-critic network architecture of FIG. 4 in accordance with the disclosed embodiments.

FIG. 7A is a block diagram of one example implementation of the actor-critic network architecture 102 of FIG. 4 in accordance with the disclosed embodiments. In particular, FIG. 7A illustrates further details of the attention module that is implemented in accordance with the disclosed embodiments. As noted, the attention module includes the spatial attention module 140 and the temporal attention module 160. The actor-critic network architecture 102 is based on a Deep Recurrent Deterministic Policy Gradient (DRDPG) algorithm, which is a recurrent version of DDPG algorithm. The actor-critic network architecture 102 considers both temporal attention at the temporal attention module 160 that learns to weigh the importance of previous frames of the image data at any given image data 129, and spatial attention at the spatial attention module 140 that learns the importance of different locations in the image at any given image data 129. The outputs generated by the actor-critic network architecture 102 are combined over a temporal dimension (via the 160) and over a spatial dimension (via the 140) to generate the hierarchical actions 172. The bracket associated with the spatial attention module 140 (spatial attention) represents repetitions of the actor-critic network architecture 102 along the spatial dimension. The spatial attention module 140 will detect the most important and relevant regions in the image for driving, and add a measure of importance to different regions in the image. The bracket associated with the temporal attention module 160 (temporal attention) represents repetitions of the actor-critic network architecture 102 along the temporal dimension. The temporal attention module 160 weighs the past few frames with respect to importance to decide the current driving policy. The critic network 120 is set to be a fully convolutional network for action evaluation.

To help illustrate this, FIG. 7A includes three dotted-line boxes, where each dotted-line box includes an instance of common elements: an input of image data (s) image data 129, CNN module 130, a set of region vectors 132, hidden state vector 133, attention network 134, spatial context vector 135 and a Long Short-Term Memory (LSTM) network 150. Each one of the dotted-line boxes represents the actor-critic network architecture 102 being continuously applied to updated information at different steps within a time series (t−1, t, t+1 . . . T). In other words, each dotted-line box represents processing by the actor-critic network architecture 102 at different instances in time. Also, it should be appreciated that while only three dotted-line boxes are shown in FIG. 7A, this is simply due to page size constraints and that many other instances would be present in an actual implementation as indicated by the ellipsis ( . . . ). As such, for sake of brevity, a description of blocks 130-3, 132-3, 134-3, 135-3, and 150-3 will now be provided; however, it should be appreciated that corresponding elements and the other dotted line boxes function similarly at different time windows.

Feature Map

Processing of image data ($s_T$) 129-3 begins when CNN module 130-3 receives and processes the image data ($s_T$) 129-3 to extract features and generate a feature map/tensors (represented by the top big cuboid inside 130-3). A set of region vectors 132-3 that collectively make up the feature map are extracted. Each region vector corresponds to features extracted from a different region/location in the convolutional feature maps/tensors (represented by the top big cuboid inside 130-3) that were extracted from the image data 129-3. The region vectors 132-3 are used by the spatial attention network 134-3 in calculating the context feature vectors 135-3 (which are then processed by the LSTM 150-3 based temporal attention block 160.

Figure 7B:
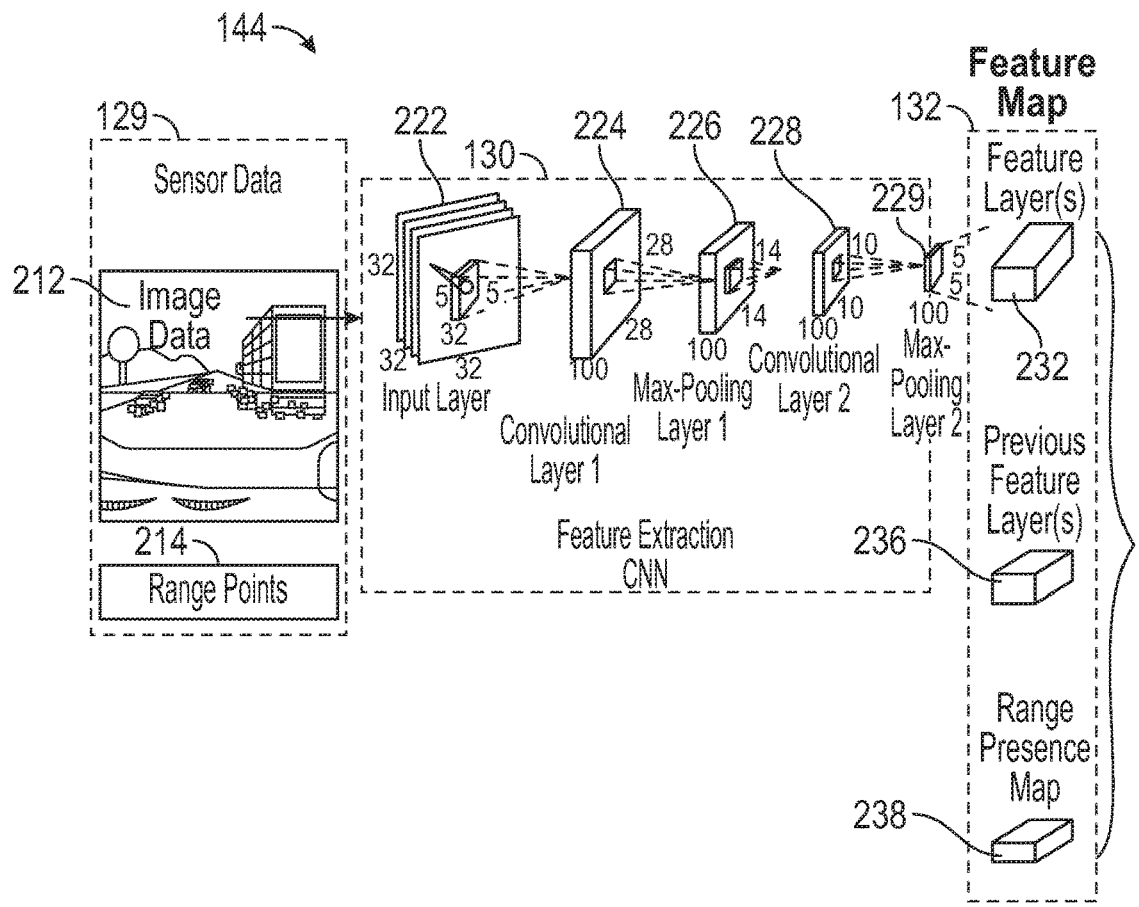
FIG. 7B is a block diagram that illustrates one exemplary implementation of the feature extraction CNN shown in FIG. 7A.

FIG. 7B is a block diagram that illustrates one exemplary implementation of the feature extraction CNN 130 shown in FIG. 7A. This implementation is non-limiting and includes a number of stages or layers including a first convolutional layer 224, a first max-pooling layer 226, a second convolutional layer 228, and a second max-pooling layer 229. However, it should be appreciated depending on the implementation, the feature extraction CNN 130 could include any number of layers required to generate a feature layer 232 based on the image data 212 that is input.

The feature extraction CNN 130 receives the sensor data 129 as an input layer 222. The sensor data 129 can include image data 212 and range point data 214. The image data 212 can include an image that includes pixel information or data (e.g., pixels) obtained via cameras. The range point data 214 can include data that is obtained by ranging systems such as lidar and/or radar systems of the vehicle. The different layers 224, 226, 228, 229 of the feature extraction CNN 130 can process pixel information that makes up the image data from an image to extract various features from that image to produce a feature layer 232. To explain further, each layer 224, 226, 228, 229 of the feature extraction CNN 130 is configured to successively process pixels of the image data to further extract features from the image data 212 and output feature layers 232, 236.

In one embodiment, the input layer 222 can be a concatenation of the input images of red-blue-green channel subtracted by a mean image to generate overall input to the neural network. A first convolutional layer 224 is configured to apply a first bank of convolutional kernels to an input layer 222 comprising red-green-blue (RGB) image data. For example, the input to the first convolutional layer 224 can be convoluted with a bank of convolutional kernels to generate output neural activations through a non-linear activation function such as a rectified linear unit (ReLU) function. Each convolutional kernel generates a first layer output channel that comprises an image having a first resolution. A first max-pooling layer 226 is configured to process each first output channel by applying a maximum value operation to that first output channel to down-scale the corresponding image and generate a down-scaled map having the first resolution. The first max-pooling layer 226 outputs a plurality of second output channels that each comprise an image having a second resolution that is less than the first resolution. A second convolutional layer 228 configured to apply a second bank of convolutional kernels to each of the plurality of second output channels. Each convolutional kernel of the second bank generates a third output channel that comprises an image having a third resolution that is less than the second resolution. For example, the input to the second convolutional layer 228 can be convoluted with another bank of convolutional kernels to generate output neural activations through a non-linear activation function such as a ReLU function. A second max-pooling layer 229 configured to process each third output channel by applying another maximum value operation to that third output channel to down-scale the corresponding image and generate a down-scaled map having the third resolution. The second max-pooling layer 229 outputs a plurality of fourth output channels that each comprise an image having a fourth resolution that is less than the third resolution. The feature layer comprises a three-dimensional tensor comprising the plurality of fourth output channels.

The feature extraction CNN 130 processes the range point data 214 to generate a range presence map 238 of range point data. Each range point indicates a value of a distance from a vehicle. The feature extraction CNN 130 concatenates each feature layer 232 with a previous feature layer 236 and a range presence map 238 to generate and output the feature map 132. The feature map 132 is the concatenated layers from feature layer 232, the previous feature layer 236, and the range presence map 238. In other words, the concatenation of range presence map 238, the current vision-based feature map 232 and a previous vision-based feature map 236 from a previous time instant form the whole feature map 132.

Spatial Attention

The spatial attention module 140 is applied after the feature extraction layers 130 and before the recurrent layers 150. The spatial attention module 140 can apply spatial attention to learn weights for different areas in an image, and a spatial context vector ($Z_T$) 135-3 used by LSTM network 150-3 will be a weighted sum combination of spatial features multiplied by the learned weights. This allows the spatial attention module 140 to add importance to different locations or regions within the image data 129-3. For example, the spatial attention module 140 allows the system to learn the importance of different areas in the camera images which enable it to better handle other vehicle and road objects while making lane-changes.

The attention network 134-3 can include one or more fully connected layers followed by activation functions. In one embodiment, the attention network ($g_T^i$) 134-3 is a fully connected layer followed by a softmax function that can be used to convert values into action probabilities. As is known in the art, in a fully connected layer, each neuron receives input from every element of the previous layer. Fully connected layers connect every neuron in one layer to every neuron in another layer. Neurons in a fully connected layer have connections to all activations in the previous layer. The set of region vectors 132-3 are applied to the attention network 134-3 along with a previous hidden state vector ($h_{t+1}$) 133-3 that is generated by the LSTM network 150-2 from the previous stage (at past time step t+1). The attention network ($g_T^i$) 134-3 is part of the spatial attention module 140. The attention network 134-3 processes the set of region vectors 132-3 and the hidden state vector 133-3 that is generated by the LSTM network 150-2 from the previous stage to generate a spatial context vector ($Z_T$) 135-3, which is a lower dimensional weighted version of all the region vectors 132-3 output from the CNN 130-3. The attention network ($g_T^i$) 134-3 learns and assigns spatial weightages to each of the set of region vectors 132-3.

For example, if at time step t, the convolutional layers 130-3 produce a set of d feature maps 132-3 with size m×n, these feature maps 132 can also be seen as a set of region vectors with a certain length. Each region vector corresponds to the features extracted by a CNN 130 at a different image region. In soft attention mechanism, which means learning a deterministic weighted context in the system, it can be assumed that the spatial context vector ($Z_T$) 135-3 is represented by a weighted sum of all-region vectors 132-3. The weights in this sum are chosen in proportion to the importance of this vector (e.g., the extracted feature in this image region), which is learned by the attention network ($g_T^i$) 134-3. The attention network ($g_T^i$) 134-3 has region vector vi and hidden state $h_{t-1}$ produced by LSTM layer 150-2 as input, and outputs the corresponding importance weight for the region vector $v_i$.

The attention network ($g_T^i$) 134-3 can be serve as a mask over the CNN feature maps 132-3, where the attention network ($g_T^i$) 134-3 reweights the region features to get the most informative features for computing the actions. Thus, the spatial attention acquires the ability to select and focus on the more important regions when making the action choice. This also helps to reduce the total number of parameters in the network for more efficient training and testing.

Recurrence and Temporal Attention

The driving task often features incomplete and noisy perception information, partially due to the partial observability from sensors. Given only one frame of input, the autonomous driver cannot collect sufficient environment information to generate the right driving behavior. For example, one ignored information is the velocity of surrounding vehicles, which are crucial when making lane-changes. This makes driving a Partially-Observable Markov Decision Process (POMDP). To deal with partial observability, recurrence is introduced to better estimate the underlying true environment state.

More specifically, recurrence is added to the DDPG algorithm via the LSTM network 150 to include temporal dependencies in driving tasks. The LSTM network 150-3 is a recurrent neural network (RNN) module of LSTM cells. Each LSTM cell can process data sequentially and keep its hidden state through time.

Figure 7C:
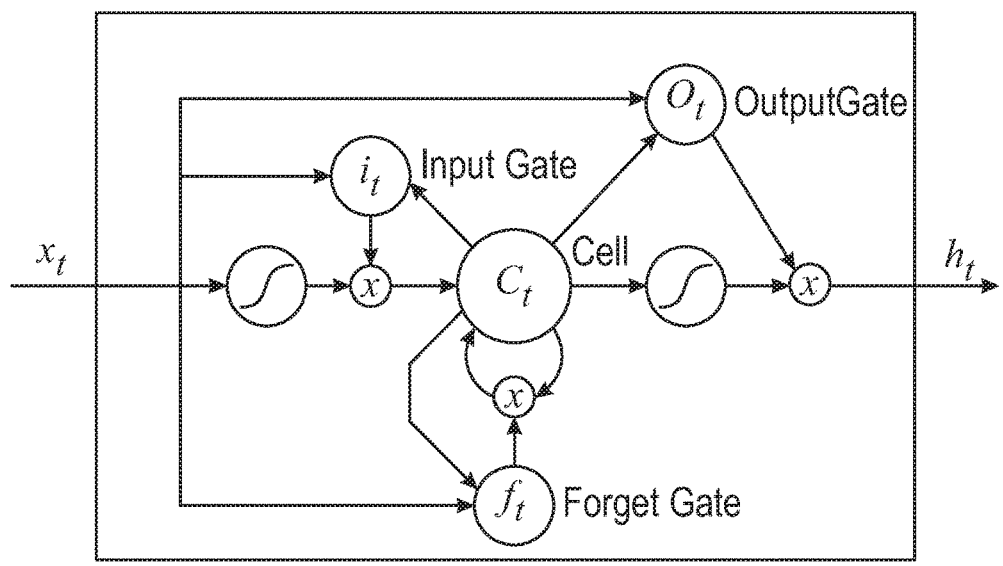
FIG. 7C is a block diagram of one non-limiting example of an LSTM cell that can be implemented as part of a LSTM network of LSTM cells in accordance with the disclosed embodiments.

FIG. 7C is a block diagram of one non-limiting example of an LSTM cell that can be implemented as part of a LSTM network 150-3 of LSTM cells. The LSTM cell includes input (i.e. i), output (i.e. o), and forget (i.e. f) gates. Each of these gates can be thought as a "standard" neuron in a feed-forward (or multi-layer) neural network: that is, they compute an activation (using an activation function) of a weighted sum. $i_t$, $o_t$ and $f_t$ represent the activations of respectively the input, output and forget gates, at time step t. The three exit arrows from the memory cell c to the three gates i, o and f represent the peephole connections. These peephole connections actually denote the contributions of the activation of the memory cell c at time t−1, i.e. the contribution $c_{t-1}$ (and not $c_t$, as the picture may suggest). In other words, the gates i, o and f calculate their activations at time step t (i.e., respectively, $i_t$, $o_t$ and $f_t$) also considering the activation of the memory cell c at time step t−1, i.e. $c_{t-1}$. The single left-to-right arrow exiting the memory cell is not a peephole connection and denotes $c_t$. The little circles containing a x symbol represent an element-wise multiplication between its inputs. The big circles containing an S-like curve represent the application of a differentiable function (like the sigmoid function) to a weighted sum. It should be appreciated that the LTSM cell of FIG. 7C is non-limiting that that other kinds of LSTM cells could be implemented within the LSTM network 150-3 as well.

Referring again to FIG. 7A, the LSTM network 150-3 processes the hidden state vector ($h_{t+1}$) 133-3 and the spatial context vector ($Z_T$) 135-3 to generate an output 152-3 that is equal to the product of a temporal attention weight ($w_T$) and a hidden state vector ($h_T$). The LSTM network 150-3 will process the temporal information in the network instead of just having stacked historical observations as input. Also, a longer sequence of history information can be incorporated and considered due to the connectivity through time via RNN, which could help generate more complex driving strategies. As compared to the original DDPG, DRDPG offers several advantages, including the ability to handle longer input sequences, exploration of temporal dependencies and better performance in case of partially observable experiences.

In addition to considering temporal dependencies with a RNN module (i.e., LSTM network 150-3), in DRDPG model, temporal attention is applied over the output of the LSTM layer (which includes outputs from all of the LSTM network 150 modules) so that it can be decided which frames in past observations matter the most. The temporal attention module 160 learns scalar weights ($w_t$, $w_{t+1}$ ... $w_T$) for LSTM outputs 152-1, 152-2 ... 152-3 (and outputs from other instances of LSTMs 150 that are not shown in FIG. 7A) in different time steps. The weight of each LSTM output $w_i$ is defined as an inner product of the feature vector $v_i$ 132 and LSTM hidden vector $h_i$ 133 followed by a softmax function to normalize the sum of weights to 1. This can be expressed in equation (1) as follows:

$$w_{T+1-i} = \text{Softmax}(v_{T+1-i} h_{T+1-i}) \; i=1,2,\ldots T. \tag{1}$$

By this definition, each learned weight is dependent on the previous time step's information and current state information. The learned weights can be interpreted as the importance of the LSTM output at a given frame. Therefore, the optimizing process can be seen as learning to choose which observations are relatively more important for learning the correct actions. The temporal attention allows the system to learn the temporally important information as the vehicle is driving by weighing the importance of previous sensory observations. Temporal attention works in the sense that it explicitly considers the past T frames' LSTM output features for computing the action output, while this information is only passed implicitly through plain LSTM. By increasing the value of T, the model can consider a longer sequence of history frames and thus can make a better action choice.

The LSTM outputs 152-1, 152-2 ... 152-3 (and outputs from other instances of 150 that are not shown in FIG. 7A) are then combined to generate a combined context vector ($C_T$) 162. The combined context vector ($C_T$) 162 is a lower dimensional tensor representation that is a weighted sum of all the LSTM outputs through T time steps (e.g., a weighted sum of all the region vectors). This can be expressed in equation (2) as follows:

$$C_T = \Sigma_{i=1}^{T}(w_{T+1-i} h_{T+1-i}). \tag{2}$$

Hierarchical Actions

The combined context vector ($C_T$) 162 is then passed through one or more fully connected (FC) layer(s) 170 before computing the hierarchical actions 172 of the actor network 110. In one embodiment, the hierarchical actions 172 can be a single vector that represents all of the hierarchical actions.

Figure 8:
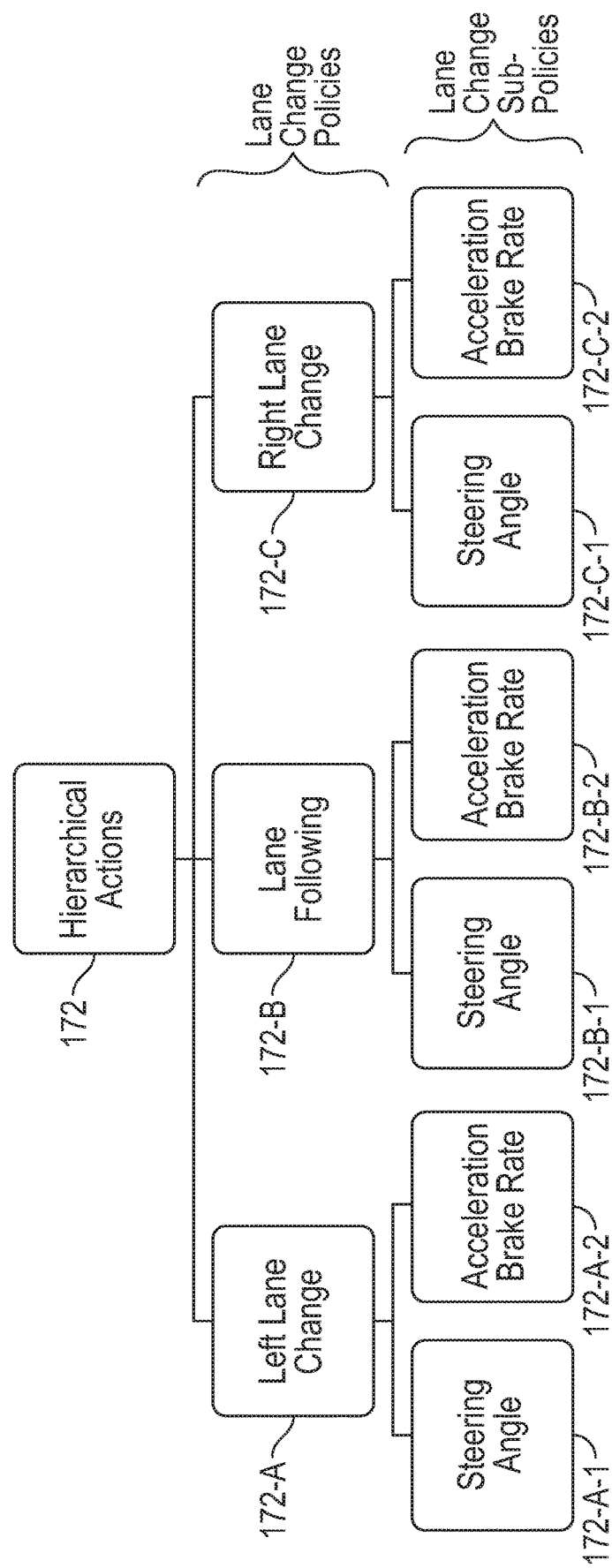
FIG. 8 is a block diagram that illustrates a hierarchical action space of hierarchical actions designed for lane-change behaviors in accordance with the disclosed embodiments in accordance with the disclosed embodiments.

FIG. 8 is a block diagram that illustrates a hierarchical action space of hierarchical actions 172 designed for lane-change behaviors in accordance with the disclosed embodiments. As shown in FIG. 8, the 172 can includes various lane-change policies 172-A, 172-B, 172-C. To deal with lane-change behaviors in driving policies, it is necessary to make both high-level decisions on whether to have lane-changes as well as do low-level planning regarding how to make lane-changes. In this example, there are three mutually exclusive, discrete, high-level actions: left lane-change 172-A, lane following 172-B, and right lane-change 172-C. At each time step, a driver agent must choose one of the three high-level actions to execute.

Each lane-change policy will have an associated steering angle command and an associated acceleration or brake rate. For instance, the left lane-change policy 172-A has an associated steering angle command 172-A-1 and an associated acceleration or brake rate 172-A-2, while a lane following policy 172-B has an associated steering angle command 172-B-1 and an associated acceleration or brake rate 172-B-2, while the right lane-change policy 172-C has an associated steering angle command 172-C-1 and an associated acceleration or brake rate 172-C-2. Each action requires 2 continuous-valued parameters that must be specified. In one implementation, the Steering Angle parameter has a value limited to the range of [−60, 60] degrees. Large steering angles are intentionally prevented for safe driving. The Acceleration Brake Rate (ABR) parameter is applied to the vehicle control module, and is a real value in the range of [−10, 10]. A positive value here means acceleration and a negative value means brake. In one embodiment, the high-level discrete actions are defined as $A_d = \{a^{straight}, a^{left}, a^{right}\}$. Each discrete action $a \in A_d$ contains a set of continuous parameters $P_a = \{p_1^a, \ldots p_n^a\}$. In one embodiment, the overall hierarchical action space can be defined as shown in equation (3) as follows: hierarchical action space can be defined as shown in equation (3) as follows:

$$A = \{\text{straight}, p_{angle}^{straight}, p_{ABR}^{straight}\} \cup \{\text{left}, p_{angle}^{left}, p_{ABR}^{left}\} \cup \{\text{right}, p_{angle}^{right}, p_{ABR}^{right}\}. \quad (3)$$

The three sets of actions are meant to represent three different types of driving behavior. They all share the same structure of parameters but should be able to differentiate when encountering different driving scenarios. During training, the system will learn to choose from the three high-level action decisions and apply proper parameters specific to that action.

Figure 9:
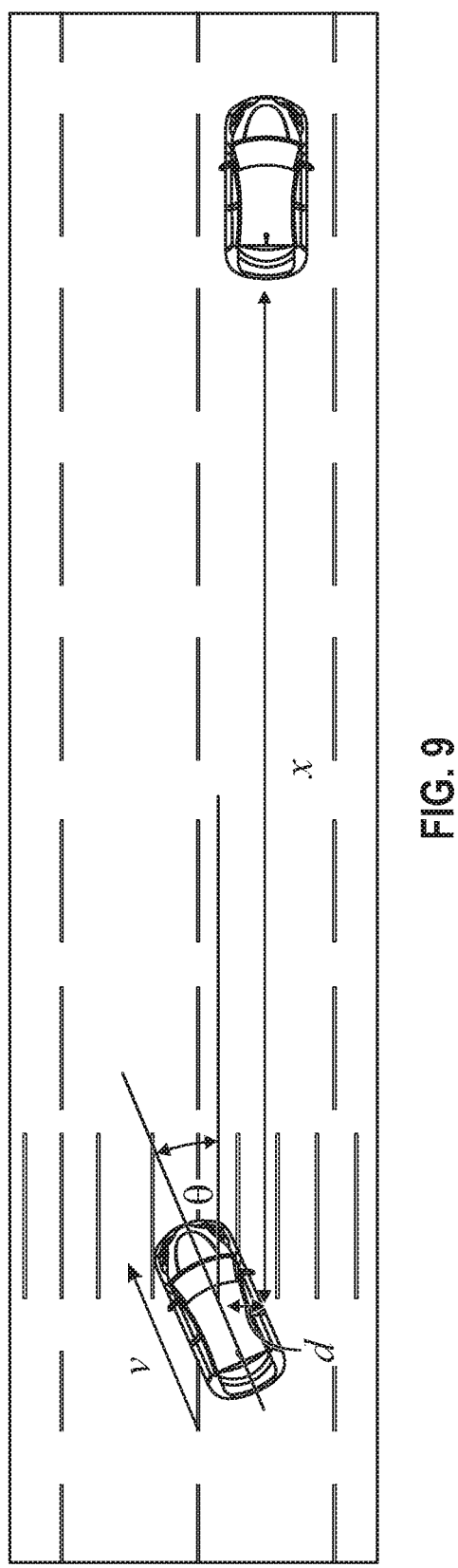
FIG. 9 is a diagram that illustrates variables considered in making a lane-change and how they impact reward signal design in accordance with the disclosed embodiments.

FIG. 9 is a diagram that illustrates variables considered in making a lane-change and how they impact reward signal design. In reinforcement learning algorithms, an important part is to design a good task-specific reward to guide the learning. A simple and straightforward reward in self-driving can be the distance that the car can go before crashing. However, such a reward signal is too uninformative for the learning driver agent to collect enough information for lane-changes. So it is desirable to define specific reward functions to encourage the vehicle to stay in the lane and also to perform a lane-change when the situation allows. The reward signal should assure both driving comfortability and efficiency. In accordance with the disclosed embodiment, the final reward includes at least five components. The speed of the vehicle should align with the direction of the road. Speed in the road direction is rewarded and the speed deviating from the road direction is punished. The variable θ>0 represents the angle of deviation from the road direction (so r1=cos θ−sin θ). The variable d represents the current distance to the center of the lane. The car should remain in the center of the lane while driving, so any lateral distance from the center of the lane is punished (so r2=−|d|). A large negative penalty is assessed when the car goes outside the road boundary (so r3=− ✱ {Out of Boundary}). The variable v represents speed of the vehicle. The vehicle is encouraged to have larger speed, but not to exceed 35 meters/second. For lane-change purposes, the vehicle is encouraged to overtake if the front vehicle is within a distance of 100 meters. Here x is the distance to the front vehicle in the same lane. If no vehicle is found, then x has a default value of 100 (so r5=−max(0, 100−x)). The overall reward function can be a combination (e.g., a linear combination) of terms above. The rewards can be normalized to the range (0, 1) and then a search on the different weighting coefficients can be performed to find the best combination that generates a good result.

Figure 10:
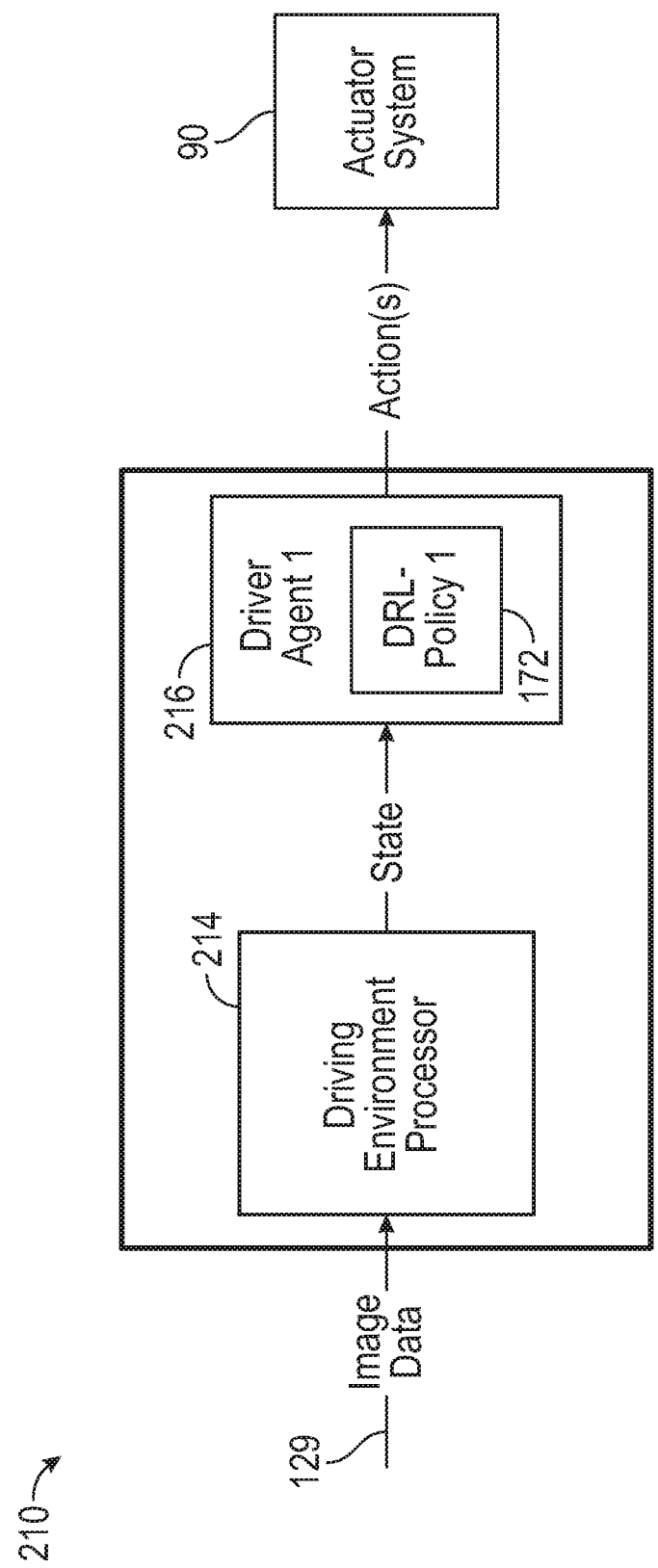
FIG. 10 is a block diagram that illustrates an AI driver agent system that includes a driving environment processor and an artificial intelligence (AI) based autonomous driver agent module in accordance with the disclosed embodiments.

Once the lane-change policies 172 have been generated they can be deployed to AI driver agent systems used in vehicles to control operation of the vehicles as will be described below with reference to FIG. 10. FIG. 10 is a block diagram that illustrates an AI driver agent system 210 that includes a driving environment processor 214, and an artificial intelligence (AI) based autonomous driver agent module 216 in accordance with the disclosed embodiments.

FIG. 10 illustrates interactions between the driving environment processor 214 and its corresponding AI based autonomous driver agent module 216 based on the driving environments observed by the driving environment processor 214. The driver agent 216 follows a policy 172 to drive a vehicle in a particular driving environment as observed by the driving environment processor 214. Each policy 172 can process state (S) of the driving environment (as observed by the driving environment processor 214), and generate actions (A) that are used to control a particular AV that is operating in that state (S) of the driving environment. The variations in the driving environment can include, for example different start/goal positions, different traffic configurations, different road configurations, different lighting/weather/visibility conditions, etc. In one embodiment, each policy 172 is a lane-change policy (described with reference to FIG. 8) developed through Deep Reinforcement Learning (DRL), and can therefore be referred to as a DRL-policy. In one embodiment, the policies 172 can be initially sampled from a pool of policies that can be obtained from human driving data or a simulation environment. The policies 172 can then be improved over time using the actor-critic network architecture 102 based on a Deep Recurrent Deterministic Policy Gradient (DRDPG) algorithm.

In one embodiment, the actions (A) generated by the driver agent 216 are sent to a low-level controller (not illustrated) that can process an action to generate commands that control one or more of actuator devices of actuator system 90 in accordance with the action to schedule and execute one or more control actions to be performed to automatically control the autonomous vehicle and automate the autonomous driving task encountered in a particular driving scenario (e.g., to achieve one or more particular vehicle trajectory and speed profiles need to execute a lane-change policy). To explain further with reference to FIGS. 2 and 3, the actions of FIG. 10 are equivalent to the control signals 72 of FIG. 3. As described above with reference to FIG. 3, in one embodiment, the actuator system 90 includes a low-level controller and a plurality of actuators of the vehicle (e.g., a steering torque or angle controller, a brake system, a throttle system, etc.). The low-level controller processes the action (or control signals 72 of FIG. 3) to generate signals or commands that control the actuators (actuator devices 42a-42n of FIG. 2) in accordance with the action (or control signals 72 of FIG. 3) to schedule and execute one or more control actions to be performed to automate driving tasks. The action (or control signals 72 of FIG. 3) specify or map to control actions and parameters that are used to schedule the one or more scheduled actions to be performed to automate driving tasks. The one or more control actions automatically control the autonomous vehicle to automate an autonomous driving task encountered in a particular driving scenario (e.g., to achieve a particular vehicle trajectory and speed profile need to execute the lane-change policy 172).

Figure 11:
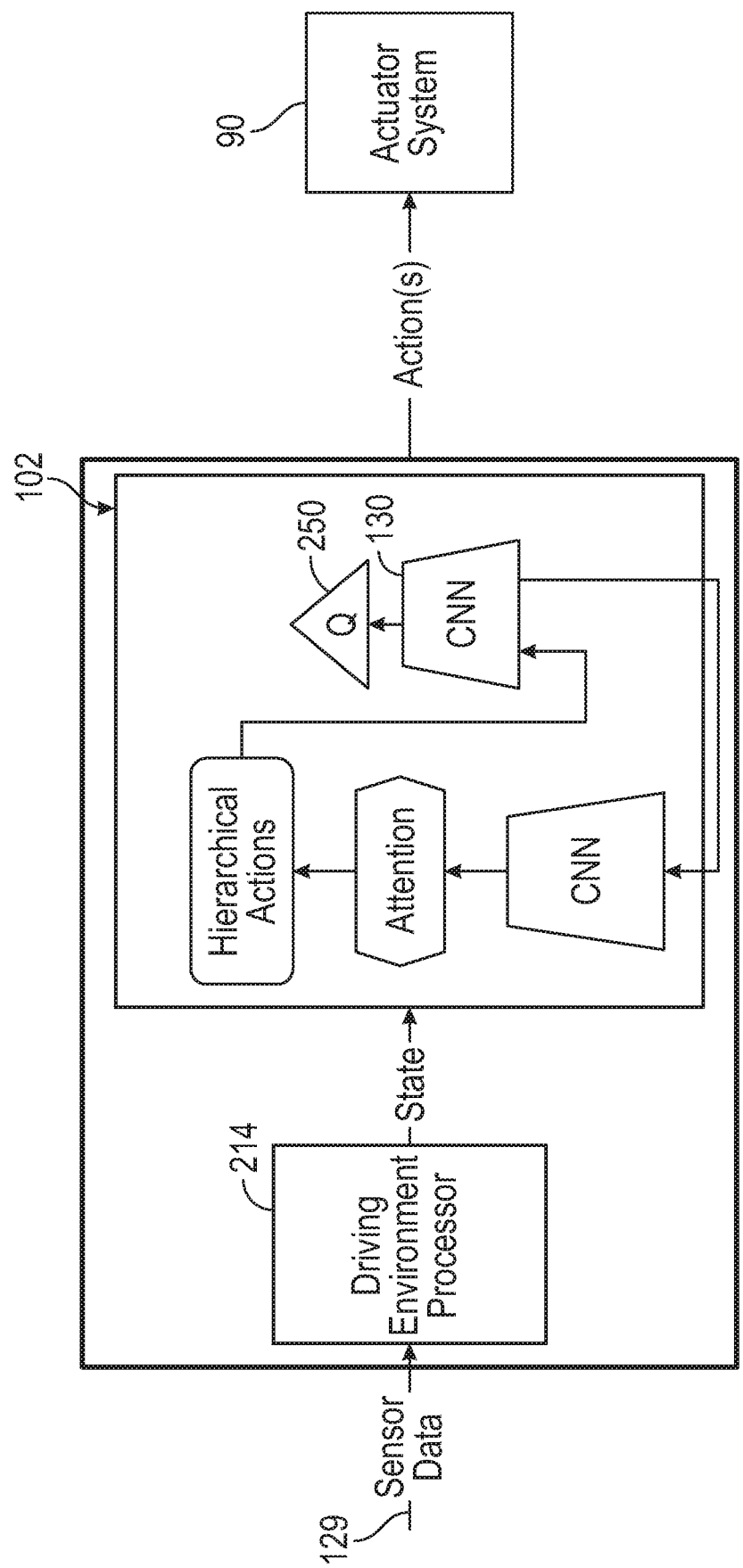
FIG. 11 is a block diagram that illustrates an online learning system that includes a driving environment processor and an artificial intelligence (AI) based autonomous driver agent module that implements the actor-critic network architecture based on a Deep Recurrent Deterministic Policy Gradient (DRDPG) algorithm in accordance with the disclosed embodiments.

Alternatively, in some implementations, the actor-critic network architecture 102 of FIGS. 4-7C can implemented online within a real autonomous vehicle to acquire actual image data through the sensors (e.g., sensors 28 in FIG. 3), sense the driving environment (i.e., actual observations from the driving environment) and further train the system in a real or actual driving environment as will be described in greater detail below with reference to FIG. 11. FIG. 11 is a block diagram that illustrates an online learning system that includes a driving environment processor 214, and an artificial intelligence (AI) based autonomous driver agent module that implements the actor-critic network architecture 102 based on DRDPG algorithm in accordance with the disclosed embodiments. In this embodiment, the vehicle that the online learning system is deployed within utilizes the actor-critic network architecture 102 to learn and update lane-change policies in real time, while also performing the various other functions of the driver agent 216 as described above with reference to FIG. 10.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for learning lane-change policies via an actor-critic network architecture, wherein each lane-change policy describes one or more actions selected to be taken by an autonomous vehicle, the method comprising:
processing, via an actor network over time, image data received from an environment to learn the lane-change policies as a set of hierarchical actions, wherein the lane-change policies each comprise a high-level action and associated low-level actions, wherein the high-level actions comprise: a left lane-change, lane following, and a right lane-change, and wherein each of the associated low-level actions comprises a steering angle command parameter and an acceleration-brake rate parameter; and
predicting action values via an action-value function at a critic network;
evaluating, via the critic network, a lane-change policy;
calculating, via the critic network, loss and gradients to drive learning and update the critic network;
wherein processing via the actor network at each particular time step comprises:
processing, at a convolutional neural network (CNN) of the actor network, the image data to generate a feature map that comprises a machine-readable representation of the driving environment that includes features of the environment acquired at the particular time step;
processing, at a spatial attention module of the actor network, the feature map to select relevant regions in the image data that are of importance to focus on for computing actions when making lane-changes while driving;
learning, at the spatial attention module, importance weights for each of the relevant regions of the image data;
applying, at the spatial attention module, the learned importance weights to each of the relevant regions of the image data to add importance to the relevant regions of the image data;
generating, at the spatial attention module, a spatial context vector; and
processing, at a temporal attention module of the actor network, the spatial context vector to learn temporal attention weights that are applied to past frames of image data to indicate relative importance of the past frames;
generating, at the temporal attention module, a combined context vector; and
processing, via at least one fully connected layer, the combined context vector to generate the set of hierarchical actions.

2. The method according to claim 1, wherein processing, via the actor network over time, the image data received from the environment, comprises:
processing the image data received from the environment to learn the lane-change policies as the set of hierarchical actions that are represented as a vector of a probability of action choices and a first set of parameters coupled to each discrete hierarchical action, and
wherein predicting the action values via the action-value function at the critic network, comprises:
predicting action values via the action-value function at the critic network using a second set of parameters, wherein the action-value function is represented as a neural network using the second set of parameters;
wherein evaluating, via the critic network, the lane-change policy, comprises:
evaluating, via the critic network based on transitions generated by the actor network, the lane-change policy, wherein the transitions comprise the image data, the hierarchical actions, rewards, and next image data generated by the actor network.

3. The method according to claim 2, wherein the calculating, via the critic network, the loss and the gradients to drive learning and update the critic network, comprises:
calculating, via the critic network, loss and gradients to drive learning and update the second set of parameters of the critic network, wherein the calculating, via the critic network, comprises:
processing, at the critic network during a back-propagation mode, an obtained mini-batch of transitions comprising the image data, the hierarchical actions, rewards, next image data generated by the actor network;
computing, at the critic network, first gradients of the action-value function by differentiating a loss of the critic network with respect to the second set of parameters, wherein the first gradients are gradients of an error in predicting the action-value function with respect to the second set of parameters, wherein the first gradients are to be used for updating for the second set of parameters of the critic network;
updating the second set of parameters at the critic network based on the first gradients;
computing, at the critic network, second gradients of the action-value function with respect to the hierarchical actions generated by the actor network by differentiating a loss of the critic network with respect to the hierarchical actions taken by the actor network; and
further comprising:
back-propagating the second gradients to the actor network;
processing the second gradients at the actor network along with third gradients generated by the actor network to update the first set of parameters, wherein the third gradients are generated by differentiating a loss of the actor network with respect to the hierarchical actions taken by the actor network.

4. The method according to claim 1, wherein the spatial attention module comprises: an attention network comprising at least one fully connected layer in which each neuron receives input from all activations of a previous layer; and an activation function coupled to the fully connected layer that coverts values into action probabilities, and wherein a set of region vectors are extracted from the feature map by the CNN, wherein each region vector corresponds to a different feature layer of features extracted from a different image region of the image data by the CNN; and wherein learning, at the spatial attention module, importance weights for each of the relevant regions of the image data, comprises:
applying, at the attention network, the set of region vectors along with a previous hidden state vector that was generated by an LSTM network during a past time step, to learn an importance weight for each region vector of the set of region vectors;
wherein applying, at the spatial attention module, the learned importance weights to each of the relevant regions of the image data to add importance to the relevant regions of the image data, comprises:
applying, at the attention network, the learned importance weights to each region vector of the set of region vectors to add importance to each region vector of the set of region vectors in proportion to importance of that region vector as learned by the attention network, and
wherein generating, at the spatial attention module, the spatial context vector, comprises:
generating, at the attention network, the spatial context vector that is a lower dimensional weighted version of the set of the region vectors that is represented by a weighted sum of all of the set of the region vectors.

5. The method according to claim 4, wherein the spatial attention module and the temporal attention module each comprise: a Long Short-Term Memory (LSTM) network of LSTM cells, wherein each LSTM cell processes input data sequentially and keeps a hidden state of that input data through time, and
wherein the processing, at the temporal attention module of the actor network, the spatial context vector to learn temporal attention weights to be applied to past frames of image data to indicate relative importance in deciding which lane-change policy to select, comprises:
processing, at the LSTM network at each time step, the spatial context vector for that time step and the previous hidden state vector that was generated by the LSTM network during the past time step to generate an LSTM output;
learning, at the LSTM network, a temporal attention weight for each LSTM output at each time step, wherein the learned temporal attention weight is an inner product of the region vector at that time step and the hidden vector at that time step, and reflects a relative importance of that LSTM output at a given frame so that frames that matter the most for learning the correct actions are considered to have higher importance for computing an action output;
normalizing, via a softmax function at the LSTM network, the sum of all of the learned temporal attention weights to one; and
generating, at the LSTM network at each time step, a weighted output for that time step that is equal to the product of a learned temporal attention weight at that time step and a hidden state vector at that time step.

6. The method according to claim 5, wherein generating, at the temporal attention module, the combined context vector, comprises:
combining, at the LSTM network at each time step, the LSTM outputs from each time step to generate the combined context vector that is a weighted sum of all the LSTM outputs over a number (T) of time steps.

7. The method according to claim 1, wherein the actor-critic network architecture is based on a Deep Recurrent Deterministic Policy Gradient (DRDPG) algorithm that considers both temporal attention at the temporal attention module that learns to weigh the importance of previous frames of image data at any given frame of the image data, and spatial attention at the spatial attention module that learns the importance of different locations in the any given frame of the image data, wherein the spatial attention module and the temporal attention module collectively improve lane-change policy selection of the actor network.

8. The method according to claim 1, wherein the actor-critic network architecture is deployed within a vehicle controlled by a driver agent, and the method further comprising:
choosing, at the driver agent, one of the high-level actions to execute at each time step based on a current observed environment.

9. An actor-critic network system, comprising:
a non-transitory computer readable medium comprising:
an actor network configured to, by a processor: process image data received from an environment over time to learn lane-change policies as a set of hierarchical actions, wherein each lane-change policy describes one or more actions selected to be taken by an autonomous vehicle, wherein the lane-change policies each comprise a high-level action and associated low-level actions, wherein the high-level actions comprise: a left lane-change, lane following, and a right lane-change, and wherein each of the associated low-level actions comprises a steering angle command parameter and an acceleration-brake rate parameter; and
a critic network configured to, by a processor: predict action values via an action-value function, evaluate a lane-change policy, and calculate loss and gradients to drive learning and update the critic network,
wherein the actor network comprises:
a convolutional neural network (CNN) configured to process the image data is received from the environment at a particular time step to generate a feature map that comprises a machine-readable representation of the driving environment that includes features of the environment acquired at the particular time step;
a spatial attention module configured to: process the feature map to select relevant regions in the image data that are of importance to focus on for computing actions when making lane-changes while driving; learn importance weights for each of the relevant regions of the image data; apply the learned importance weights to each of the relevant regions of the image data to add importance to the relevant regions of the image data; and generate a spatial context vector; and
a temporal attention module configured to process the spatial context vector to learn temporal attention weights that are applied to past frames of image data to indicate relative importance of the past frames, wherein the temporal attention module is configured to generate a combined context vector; and
at least one fully connected layer configured to process the combined context vector to generate the set of hierarchical actions.

10. The system according to claim 9, wherein the actor network is configured to: process the image data received from the environment to learn the lane-change policies as the set of hierarchical actions that are represented as a vector of a probability of action choices and a first set of parameters coupled to each discrete hierarchical action, and
wherein the critic network is configured to:
predict the action values via the action-value function using a second set of parameters, wherein the action-value function is represented as a neural network using the second set of parameters;

evaluate the lane-change policy, based on transitions generated by the actor network, where the transitions comprise the image data, the hierarchical actions, rewards, and next image data generated by the actor network.

11. The system according to claim 10, wherein the critic network is configured to calculate the loss and the gradients to drive learning and update the second set of parameters of the critic network, and wherein the critic network is further configured to:

process, during a back-propagation mode, an obtained mini-batch of transitions comprising the image data, the hierarchical actions, rewards, the next image data generated by the actor network;

compute first gradients of the action-value function by differentiating a loss of the critic network with respect to the second set of parameters, wherein the first gradients are gradients of an error in predicting the action-value function with respect to the second set of parameters, and are used for updating for the second set of parameters of the critic network;

update the second set of parameters at the critic network based on the first gradients;

compute second gradients of the action-value function with respect to the hierarchical actions generated by the actor network by differentiating a loss of the critic network with respect to the hierarchical actions taken by the actor network;

back-propagate the second gradients to the actor network; and wherein the actor network is configured to:

generate third gradients by differentiating a loss of the actor network with respect to the hierarchical actions taken by the actor network; and process the second gradients along with the third gradients.

12. The system according to claim 9, wherein the actor network comprises:

the convolutional neural network (CNN) configured to process the image data is received from the environment to generate the feature map, and to extract a set of region vectors from the feature map, wherein each region vector corresponds to a different feature layer of features extracted from a different image region of the image data by the CNN;

wherein the spatial attention module comprises:

an attention network comprising at least one fully connected layer in which each neuron receives input from all activations of a previous layer; and an activation function coupled to the fully connected layer that coverts values into action probabilities, wherein the set of region vectors are applied to the attention network along with a previous hidden state vector that was generated by an LSTM network during a past time step, wherein the attention network is configured to learn and assign an importance weight to each region vector of the set of region vectors in proportion to importance of that region vector as learned by the attention network, and wherein the attention network is configured to generate the spatial context vector that is a lower dimensional weighted version of the set of the region vectors that is represented by a weighted sum of all of the set of the region vectors;

wherein the spatial attention module and the temporal attention module each comprise:

a Long Short-Term Memory (LSTM) network of LSTM cells, wherein each LSTM cell processes input data sequentially and keeps a hidden state of that input data through time, wherein the LSTM network is configured to:

at each time step:

process the spatial context vector for that time step and the previous hidden state vector that was generated by the LSTM network during the past time step to generate an LSTM output;

learn a temporal attention weight for each LSTM output, wherein the learned temporal attention weight is an inner product of the region vector at that time step and the hidden vector at that time step, and reflects a relative importance of that LSTM output at a given frame so that frames that matter the most for learning the correct actions are considered to have higher importance for computing an action output;

normalize, via a softmax function, the sum of all of the learned temporal attention weights to one; and generate a weighted output for that time step that is equal to the product of a learned temporal attention weight at that time step and a hidden state vector at that time step; and combine the LSTM outputs from each time step to generate the combined context vector that is a weighted sum of all the LSTM outputs over a number (T) of time steps;

wherein the temporal attention module further comprises:

the at least one fully connected layer configured to process the combined context vector to generate the set of hierarchical actions.

13. The system according to claim 9, wherein the actor-critic network system has an architecture based on any type of policy-gradient-based reinforcement learning algorithm.

14. The system according to claim 13, wherein the actor-critic network system has an architecture is based on a Deep Recurrent Deterministic Policy Gradient (DRDPG) algorithm that considers both temporal attention at the temporal attention module that learns to weigh the importance of previous frames of image data at any given frame of the image data, and spatial attention at the spatial attention module that learns the importance of different locations in the any given frame of the image data, wherein the spatial attention module and the temporal attention module collectively improve lane-change policy selection of the actor network.

15. The system according to claim 9, wherein the actor-critic network system is deployed within a vehicle controlled by a driver agent that is configured to choose one of the high-level actions to execute at each time step based on a current observed environment.

16. An autonomous vehicle, comprising:

a driving environment processor configured to acquire image data from an environment;

a driver agent configured to control the autonomous vehicle based on a current observed environment and lane-change policies, wherein each lane-change policy describes one or more actions to be taken by the autonomous vehicle, wherein the lane-change policies each comprise a high-level action and associated low-level actions, wherein the high-level actions comprise: a left lane-change, lane following, and a right lane-change, and wherein each of the associated low-level actions comprises a steering angle command parameter and an acceleration-brake rate parameter;
a processor configured to execute instructions of a computer program for learning lane-change policies via an actor-critic network architecture, which, when executed by the processor are configurable to perform a method comprising:
processing, via an actor network over time, image data received from the environment to learn the lane-change policies as a set of hierarchical actions; and
predicting, at a critic network, action values via an action-value function;
evaluating, at the critic network, a lane-change policy;
calculating, at the critic network, loss and gradients to drive learning and update the critic network;
wherein processing via the actor network at each particular time step comprises:
processing, at a convolutional neural network (CNN) of the actor network, the image data to generate a feature map that comprises a machine-readable representation of the driving environment that includes features of the environment acquired at the particular time step;
processing, at a spatial attention module of the actor network, the feature map to select relevant regions in the image data that are of importance to focus on for computing actions when making lane-changes while driving;
learning, at the spatial attention module, importance weights for each of the relevant regions of the image data;
applying, at the spatial attention module, the learned importance weights to each of the relevant regions of the image data to add importance to the relevant regions of the image data;
generating, at the spatial attention module, a spatial context vector; and
processing, at a temporal attention module of the actor network, the spatial context vector to learn temporal attention weights that are applied to past frames of image data to indicate relative importance of the past frames;
generating, at the temporal attention module, a combined context vector; and
processing, via at least one fully connected layer, the combined context vector to generate the set of hierarchical actions.

17. The autonomous vehicle according to claim 16, wherein the spatial attention module comprises: an attention network comprising at least one fully connected layer in which each neuron receives input from all activations of a previous layer; and an activation function coupled to the fully connected layer that coverts values into action probabilities, and wherein a set of region vectors are extracted from the feature map by the CNN, wherein each region vector corresponds to a different feature layer of features extracted from a different image region of the image data by the CNN; and
wherein learning, at the spatial attention module, importance weights for each of the relevant regions of the image data, comprises:
applying, at the attention network, the set of region vectors along with a previous hidden state vector that was generated by an LSTM network during a past time step, to learn an importance weight for each region vector of the set of region vectors;
wherein applying, at the spatial attention module, the learned importance weights to each of the relevant regions of the image data to add importance to the relevant regions of the image data, comprises:
applying, at the attention network, the learned importance weights to each region vector of the set of region vectors to add importance to each region vector of the set of region vectors in proportion to importance of that region vector as learned by the attention network, and
wherein generating, at the spatial attention module, the spatial context vector, comprises:
generating, at the attention network, the spatial context vector that is a lower dimensional weighted version of the set of the region vectors that is represented by a weighted sum of all of the set of the region vectors.

18. The autonomous vehicle according to claim 17, wherein the spatial attention module and the temporal attention module each comprise: a Long Short-Term Memory (LSTM) network of LSTM cells, wherein each LSTM cell processes input data sequentially and keeps a hidden state of that input data through time, and
wherein processing, at the temporal attention module of the actor network, the spatial context vector to learn temporal attention weights to be applied to past frames of image data to indicate relative importance in deciding which lane-change policy to select, comprises:
processing, at the LSTM network at each time step, the spatial context vector for that time step and the previous hidden state vector that was generated by the LSTM network during the past time step to generate an LSTM output;
learning, at the LSTM network, a temporal attention weight for each LSTM output at each time step, wherein the learned temporal attention weight is an inner product of the region vector at that time step and the hidden vector at that time step, and reflects a relative importance of that LSTM output at a given frame so that frames that matter the most for learning the correct actions are considered to have higher importance for computing an action output;
normalizing, via a softmax function at the LSTM network, the sum of all of the learned temporal attention weights to one; and
generating, at the LSTM network at each time step, a weighted output for that time step that is equal to the product of a learned temporal attention weight at that time step and a hidden state vector at that time step.

19. The autonomous vehicle according to claim 18, wherein generating, at the temporal attention module, the combined context vector, comprises:
combining, at the LSTM network at each time step, the LSTM outputs from each time step to generate the combined context vector that is a weighted sum of all the LSTM outputs over a number (T) of time steps.

20. The autonomous vehicle according to claim 16, wherein the driver agent is configured to select one of the high-level actions to execute at each time step based on the current observed environment.

* * * * *